United States Patent
Digonnet et al.

(10) Patent No.: US 11,629,979 B2
(45) Date of Patent: Apr. 18, 2023

(54) DIAPHRAGM-BASED FIBER ACOUSTIC SENSOR

(71) Applicant: The Board of Trustees of the Leland Stanford Junior University, Palo Alto, CA (US)

(72) Inventors: Michel J.F. Digonnet, Palo Alto, CA (US); Behrad Habib Afshar, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 17/537,213

(22) Filed: Nov. 29, 2021

(65) Prior Publication Data

US 2022/0082413 A1     Mar. 17, 2022

Related U.S. Application Data

(62) Division of application No. 16/358,469, filed on Mar. 19, 2019, now Pat. No. 11,215,481.

(Continued)

(51) Int. Cl.
| | |
|---|---|
| *G01D 5/353* | (2006.01) |
| *G02B 26/06* | (2006.01) |
| *G01H 9/00* | (2006.01) |

(52) U.S. Cl.
CPC ......... *G01D 5/35367* (2013.01); *G01H 9/006* (2013.01); *G02B 26/06* (2013.01)

(58) Field of Classification Search
CPC ..... G01D 5/35367; G01H 9/006; G02B 26/06
See application file for complete search history.

(56) References Cited

U.S. PATENT DOCUMENTS

| | | |
|---|---|---|
| 2,915,738 A | 12/1959 | Vogel |
| 3,831,137 A | 8/1974 | Cuomo |

(Continued)

FOREIGN PATENT DOCUMENTS

| | | |
|---|---|---|
| EP | 1 380 861 | 1/2004 |
| EP | 2 434 319 | 3/2012 |

(Continued)

OTHER PUBLICATIONS

Ackemann et al., "The Gouy phase shift, the average phase lag of Fourier components of Hermite-Gaussian modes and their application to resonance conditions in optical cavities," Opt. Common., vol. 189, pp. 5-14, 2001.

(Continued)

*Primary Examiner* — Kevin K Pyo
(74) *Attorney, Agent, or Firm* — Knobbe, Martens, Olson & Bear LLP

(57) ABSTRACT

A sensor includes at least one optical waveguide and an optical reflector optically coupled to the at least one optical waveguide. The optical reflector includes a first substrate portion configured to reflect a first portion of a light beam back to the at least one optical waveguide and a diaphragm configured to reflect a second portion of the light beam back to the at least one optical waveguide. The diaphragm is responsive to a perturbation by moving relative to the first substrate portion. The light beam is centered on a region between the first substrate portion and the diaphragm.

23 Claims, 17 Drawing Sheets

Related U.S. Application Data

(60) Provisional application No. 62/647,344, filed on Mar. 23, 2018.

(56) References Cited

U.S. PATENT DOCUMENTS

| | | |
|---|---|---|
| 4,159,252 A | 6/1979 | Wainwright et al. |
| 4,446,543 A | 5/1984 | McLandrich et al. |
| 4,449,781 A | 5/1984 | Lightstone et al. |
| 4,519,252 A | 5/1985 | McMahon |
| 4,525,818 A | 6/1985 | Cielo et al. |
| 4,558,950 A | 12/1985 | Ulrich |
| 4,668,093 A | 5/1987 | Cahill |
| 4,682,500 A | 7/1987 | Uda |
| 4,705,354 A | 11/1987 | Ulrich |
| 4,911,516 A | 3/1990 | Palfrey et al. |
| 4,933,545 A | 6/1990 | Saaski et al. |
| 5,000,901 A | 3/1991 | Iyer et al. |
| 5,039,492 A | 8/1991 | Saaski et al. |
| 5,052,228 A | 10/1991 | Haritonidis |
| 5,280,173 A | 1/1994 | Morse et al. |
| 5,311,485 A | 5/1994 | Kuzmenko et al. |
| 5,488,504 A | 1/1996 | Worchesky et al. |
| 5,574,699 A | 11/1996 | Cuomo |
| 5,910,286 A | 6/1999 | Lipskier |
| 6,188,644 B1 | 2/2001 | Walsh |
| 6,281,976 B1 | 8/2001 | Taylor |
| 6,289,143 B1 | 9/2001 | Berthold et al. |
| 6,539,136 B1 | 3/2003 | Dianov et al. |
| 6,542,244 B1 | 4/2003 | Rumpf |
| 6,574,396 B1 | 6/2003 | Dragone |
| 6,717,707 B2 | 4/2004 | Clark |
| 6,768,590 B2 | 7/2004 | Steinberg et al. |
| 6,777,244 B2 | 8/2004 | Pepper et al. |
| 6,798,960 B2 | 9/2004 | Hamada |
| 6,807,342 B2 | 10/2004 | Fan |
| 6,822,784 B2 | 11/2004 | Fukshima et al. |
| 6,885,784 B2 | 4/2005 | Bohnert |
| 6,925,213 B2 | 8/2005 | Boyd et al. |
| 7,024,072 B2 | 4/2006 | Chen et al. |
| 7,054,011 B2 | 5/2006 | Zhu et al. |
| 7,134,343 B2 | 11/2006 | Suzuki et al. |
| 7,155,087 B2 | 12/2006 | Suh et al. |
| 7,173,713 B2 | 2/2007 | Xu et al. |
| 7,187,816 B2 | 3/2007 | Huang |
| 7,190,869 B2 | 3/2007 | Jin et al. |
| 7,193,725 B2 | 3/2007 | Brunfeld et al. |
| 7,224,465 B2 | 5/2007 | Balachandran et al. |
| 7,233,729 B2 | 6/2007 | Romagnoli et al. |
| 7,194,906 B2 | 8/2007 | Mikado et al. |
| 7,280,265 B2 | 10/2007 | Miles |
| 7,283,716 B2 | 10/2007 | Park et al. |
| 7,308,163 B2 | 12/2007 | Bratkovski et al. |
| 7,330,277 B2 | 2/2008 | Brunfeld et al. |
| 7,333,703 B2 | 2/2008 | Hatsuda et al. |
| 7,474,823 B2 | 1/2009 | Wang et al. |
| 7,483,144 B2 | 1/2009 | Sanders |
| 7,489,846 B2 | 2/2009 | Grot et al. |
| 7,526,148 B2 | 4/2009 | Kilic et al. |
| 7,545,513 B2 | 6/2009 | Kiesel et al. |
| 7,619,744 B2 | 11/2009 | Liess |
| 7,630,589 B2 | 12/2009 | Kilic et al. |
| 7,684,657 B2 | 3/2010 | Donlagic et al. |
| 7,751,055 B2 | 7/2010 | Sanders et al. |
| 7,809,219 B2 | 10/2010 | Kilic et al. |
| 7,881,565 B2 | 2/2011 | Kilic et al. |
| 7,940,400 B2 | 5/2011 | Lopushansky et al. |
| 7,944,567 B2 | 5/2011 | Asano |
| 7,966,887 B2 | 6/2011 | Knobloch et al. |
| 7,973,936 B2 | 7/2011 | Dantus |
| 8,094,519 B2 | 1/2012 | Lagakos |
| 8,139,227 B2 | 3/2012 | Kilic et al. |
| 8,160,406 B2 | 4/2012 | Kilic et al. |
| 8,249,400 B2 | 8/2012 | Kilic et al. |
| 8,331,741 B2 | 12/2012 | Kilic et al. |
| 8,537,368 B2 | 9/2013 | Kilic et al. |
| 8,542,956 B2 | 9/2013 | Akkaya et al. |
| 8,548,283 B2 | 10/2013 | Kilic et al. |
| 8,559,770 B2 | 10/2013 | Donlagic |
| 8,662,160 B2 | 3/2014 | DeWitt |
| 8,897,610 B2 | 11/2014 | Akkaya et al. |
| 11,215,481 B2 | 1/2022 | Digonnet et al. |
| 2002/0135863 A1 | 9/2002 | Fukshima et al. |
| 2002/0159671 A1 | 10/2002 | Boyd et al. |
| 2003/0059179 A1 | 3/2003 | Jiang et al. |
| 2003/0138185 A1 | 7/2003 | Dianov et al. |
| 2003/0165291 A1 | 9/2003 | Bhagavatula et al. |
| 2003/0174952 A1 | 9/2003 | Fan |
| 2004/0008934 A1 | 1/2004 | Takiguchi et al. |
| 2004/0080726 A1 | 4/2004 | Suh et al. |
| 2004/0196874 A1 | 10/2004 | Spiegelberg et al. |
| 2004/0208449 A1 | 10/2004 | Chen et al. |
| 2004/0228575 A1 | 11/2004 | Kim et al. |
| 2005/0052724 A1 | 3/2005 | Suzuki et al. |
| 2005/0062979 A1 | 3/2005 | Zhu et al. |
| 2005/0146726 A1 | 7/2005 | Balachandran et al. |
| 2005/0169590 A1 | 8/2005 | Alkeskjold |
| 2005/0175304 A1 | 8/2005 | Romagnoli et al. |
| 2005/0186117 A1 | 8/2005 | Uchiyama et al. |
| 2005/0191025 A1 | 9/2005 | Kim et al. |
| 2005/0200498 A1 | 9/2005 | Gleitman |
| 2005/0201660 A1 | 9/2005 | Grot et al. |
| 2005/0231728 A1 | 10/2005 | Wang et al. |
| 2005/0237602 A1 | 10/2005 | Yanagisawa |
| 2006/0024813 A1 | 2/2006 | Warthoe |
| 2006/0034559 A1 | 2/2006 | Arias Vidal et al. |
| 2006/0072875 A1 | 4/2006 | Bhagavatula et al. |
| 2006/0083472 A1 | 4/2006 | Sakai et al. |
| 2006/0133715 A1 | 6/2006 | Belleville et al. |
| 2006/0193550 A1 | 8/2006 | Wawro et al. |
| 2006/0227331 A1 | 10/2006 | Volmer et al. |
| 2006/0257067 A1 | 11/2006 | Bratkovski et al. |
| 2006/0280403 A1 | 12/2006 | Suh et al. |
| 2007/0081165 A1 | 4/2007 | Kilic et al. |
| 2007/0277974 A1 | 12/2007 | Difoggio |
| 2008/0034866 A1 | 2/2008 | Kilic et al. |
| 2008/0089645 A1 | 4/2008 | Wang et al. |
| 2009/0028407 A1 | 1/2009 | Seibel et al. |
| 2009/0202195 A1* | 8/2009 | Lagakos ............... G01L 9/0077 385/13 |
| 2009/0208163 A1 | 8/2009 | Kilic et al. |
| 2010/0007893 A1 | 1/2010 | Hall |
| 2010/0092125 A1 | 4/2010 | Kilic et al. |
| 2010/0199773 A1 | 8/2010 | Zhou |
| 2010/0242628 A1 | 9/2010 | Knobloch et al. |
| 2011/0041616 A1 | 2/2011 | Kilic et al. |
| 2011/0268384 A1 | 11/2011 | Akkaya et al. |
| 2012/0116255 A1 | 5/2012 | Wang et al. |
| 2012/0182557 A1 | 7/2012 | Kilic et al. |
| 2015/0308864 A1 | 10/2015 | Paulsson et al. |
| 2015/0330830 A1 | 11/2015 | Akkaya et al. |
| 2019/0293458 A1 | 9/2019 | Digonnet et al. |

FOREIGN PATENT DOCUMENTS

| | | |
|---|---|---|
| EP | 3 059 562 A1 | 8/2016 |
| GB | 1 558 689 | 1/1980 |
| JP | 56-081802 | 7/1981 |
| JP | 58-004322 | 1/1983 |
| JP | 59-155526 | 9/1984 |
| JP | 61-056598 | 3/1986 |
| JP | 03-160774 | 7/1991 |
| JP | 06-052073 | 2/1994 |
| JP | 2002-328243 | 11/2002 |
| JP | 2003-130722 | 5/2003 |
| JP | 2003-185864 | 7/2003 |
| JP | 2005-045463 | 2/2005 |
| JP | 2005-077711 | 3/2005 |
| JP | 2007-298368 | 11/2007 |
| JP | 2008-541513 | 11/2008 |
| JP | 2009-535977 | 10/2009 |
| JP | 2010-516124 | 5/2010 |
| JP | 5491857 | 3/2014 |
| WO | WO 01/01090 A1 | 1/2001 |
| WO | WO 2006/092052 | 9/2006 |

(56) References Cited

FOREIGN PATENT DOCUMENTS

| WO | WO 2006/119200 | 11/2006 |
|---|---|---|
| WO | WO 2007/130152 | 11/2007 |
| WO | WO 2008/086448 | 7/2008 |
| WO | WO 2011/115933 | 9/2011 |

OTHER PUBLICATIONS

Afshar et al., "Lens-less, Spring-Loaded Diaphragm-Based Fiber Acoustic Sensor," 26th International Conference on Optical Fiber Sensors OSA Tech Digest (Optical Soc of America, 2018), paper WD6.
Akkaya et al., "Modeling and Demonstration of Thermally Stable High-Sensitivity Reproducible Acoustic Sensors," Journal of Microelectromechanical Systems, vol. 21, No. 6, Dec. 2012, pp. 1347-1356.
Akulichev et al., "Acoustic cavitation thresholds of sea water in different regions of the world ocean," Acoust. Phys. vol. 51, No. 2, 128-138, 2005.
Andrews et al., "A comparison of squeeze-film theory with measurements on a microstructure," Sensors and Actuators A, vol. 36, pp. 79-87, 1993.
Arya et al., "Exact Analysis of the Extrinsic Fabry-Perot Interferometric Optical Fiber Sensor Using Kirchhoff's Diffraction Formalism," Opt. Fiber Technol., vol. 1, pp. 380-384, 1995.
Astratov et al., "Resonant coupling of near-infrared radiation to photonic band structure waveguides," J. Lightwave Technol., vol. 17, No. 11, 2050-57, 1999.
Baba, K., "Theoretical characteristics of optical polarizing films using oblique metal island films," Proceedings of SPIE, vol. 6116, 611605-1, 2006.
Beard et al., "Optical fiber photoacoustic-photothermal probe," Optics Letters, vol. 23, No. 15, Aug. 1, 1998, pp. 1235-1237.
Belleville et al., "White-light interferometric multimode fiber-optic strain sensor," Opt. Lett., vol. 18, No. 1, pp. 78-80, Jan. 1, 1993.
Bergqvist, J., "Finite-element modelling and characterization of a silicon condenser microphone with a highly perforated backplate," Sensors and Actuators A 39, 191-200, 1993.
Bing Yu et al., "Fiber Fabry-Perot sensors for detection of partial discharges in power transformers," Applied Optics Optical Society of America, vol. 42, No. 16, Jun. 1, 2003, pp. 3241-3250.
Brüel & KjÆr, "Type 4179," www.bksv.com/Products/transducers/ acoustic/ microphones/microphone-cartridges/4179, downloaded from the internet on Apr. 26, 2016.
Bucaro et al., "Fiber-optic hydrophone," J. Acoust. Soc. Am. vol. 62, No. 5, 1302-04, Nov. 1977.
Bucaro et al., "Miniature, High Performance, Low-Cost Fiber Optic Microphone," J. Acoust. Soc. Am., vol. 118, No. 3, Part 1, pp. 1406-1413, Sep. 2005.
Callen et al., "Irreversibility and generalized noise," Phys. Rev. vol. 83, No. 1, 34-40, Jul. 1, 1951.
Chen et al., "High performance chitosan diaphragm-based fiberoptic acoustic sensor," Sensors and Actuators A: Physical, vol. 163, No. 1, Jun. 30, 2010, pp. 42-47.
Chin et al., "Fabry-Perot diaphragm fiber-optic sensor," Appl. Opt., vol. 46, No. 31, pp. 7614-7619, Nov. 2007.
Chow et al., "Ultra Resolution Fiber Sensor Using a Pre-stabilized Diode Laser," Post-deadline CLEO 2005, CPDA9, three pages.
Cibula et al., "Miniature fiber-optic pressure sensor with a polymer diaphragm," Appl. Opt., vol. 44, No. 14, 2736-2744, 2005.
Cole et al., "Fiber-optic detection of sound," J. Acoust. Soc. Am. vol. 62, 1136-38, Nov. 1977.
Crane, P.H.G., "Method for the calculation of the acoustic radiation impedance of unbaffled and partially baffled piston sources," J. Sound Vib. vol. 5, No. 2, 257-277, 1967.
Daley et al., "Field testing of fiber-optic distributed acoustic sensing (DAS) for subsurface seismic monitoring," The Leading Edge, vol. 32, No. 6, pp. 699-706, 2013.

Dorn et al., "Sharper focus for a radially polarized light beam," Phys. Rev. Lett., vol. 91, No. 23, 233901-1-233901-4, Dec. 5, 2003.
Eaton et al., "A new analytical solution for diaphragm deflection and its application to a surface micromachined pressure sensor," Int'l. Conf. on Modeling and Simulation of Microsystems, 1999.
Fan et al., "Analysis of guided resonances in photonic crystal slabs," Phys. Rev. B, vol. 65, p. 235112-1-235112-8, 2002.
Fine et al., "Compressibility of water as a function of temperature and pressure," J. Chem. Phys. 59, No. 10, 5529-5536, Nov. 15, 1973.
Furstenau et al., "Extrinsic Fabry-Perot interferometer vibration and acoustic sensor systems for airport ground traffic monitoring," IEE Proc. Optoelectron., vol. 144, No. 3, pp. 134-144, Jun. 1997.
Gabrielson, T.B., "Mechanical-thermal noise in micromachined acoustic and vibration sensors," IEEE Trans. Electron Devices vol. 40, No. 5, 903-909, May 1993.
Gagliardi et al., "Design and test of a laser-based optical-fiber Bragg-grating accelerometer for seismic applications," Measurement Science and Technology, vol. 19, No. 8, Jul. 21, 2008, 8 pgs.
Gander et al., "Embedded Micromachined Fiber Optic Fabry-Perot Pressure Sensors in Aerodynamics Applications," Sensors Journal, IEEE, vol. 1, No. 2003, pp. 1707-1712.
Gangopadhyay et al., "Modeling and Analysis of an Extrinsic Fabry-Perot Interferometer Cavity," Appl. Optics, vol. 44, No. 16, pp. 3192-3196, Jun. 1, 2005.
Greywall, D.S., "Micromachined optical-interference microphone," Sensors Actuators A Phys., vol. 75, 257-268, 1999.
Guggenheim et al., "Ultrasensitive plano-concave optical microresonators for ultrasound sensing," Nature Photonics, vol. 11, No. 11, pp. 714-719, 2017.
Haakestad et al., "Acousto-Optic Properties of Photonic Crystal Fibers," 2004 IEEE Ultrasonics Symposium, pp. 56-59, 2004.
Han et al., "Exact analysis of low-finesse multimode fiber extrinsic Fabry-Perot interferometers," Appl. Opt., vol. 43, No. 24, pp. 4659-4666, Aug. 20, 2004.
Hemenway et al., "All-silicon integrated optical modulator for 1.3 μm fiber-optic interconnects," Applied Physics Letters vol. 55, No. 4, Jul. 24, 1989, pp. 349-350.
Hill et al., "Fiber-Optic Hydrophone Array for Acoustic Surveillance in the Littoral," International Society for Optics and Photonics, vol. 5780, 2005, pp. 1-10.
Hirsekorn et al., "Modelling and simulation of acoustic wave propagation in locally resonant sonic materials, www.sciencedirect. com," Ultrasonics 42, pp. 231-235, 2004.
Holden, J., "Multiple-beam interferometry: intensity distribution in the reflected system," Proc. Phys. Soc. B, vol. 62, Part 7, pp. 405-417, Jul. 1, 1949.
Homentcovschi et al., "Modeling of Viscous Damping of Perforated Planar Microstructures. Applications in Acoustics," Journal of the Acoustical Society of America, vol. 116, No. 5, 2939-2947, Nov. 2004.
Homentcovschi et al., "Viscous damping of perforated planar micromechanical structures," Sensors and Actuators A 119, 544-552, 2005.
Hu et al., "Influence of three-dimensional roughness on pressure-driven flow through microchannels," J. Fluids Eng. 125, 871-879, Sep. 2003.
Jo et al., "Miniature fiber acoustic sensors using a photonic-crystal membrane," Optical Fiber Technology, vol. 19, No. 6, Aug. 28, 2013, pp. 785-792.
Jo et al., "Piconewton force measurement using a nanometric photonic crystal diaphragm," Optics Letters, vol. 39, No. 15, Aug. 1, 2014, pp. 4533-4536.
Jo et al., "Ultra-sensitive acoustic fiber sensors utilizing nano-membranes," Proc. SPIE 9634, 24th International Conference on Optical Fibre Sensors, 96341P (Sep. 28, 2015).
Jo et al., "Highly sensitive phase-front-modulation fiber acoustic sensor," J. of Lightwave Technol., vol. 33, No. 20, 4377-4383, 2015.
Jo et al., "Highly Sensitive Phase-Front-Modulation Fiber Acoustic Sensor," Journal of Lightwave Technology, vol. 22, No. 20, Oct. 15, 2015, pp. 4377-4383.

(56) References Cited

OTHER PUBLICATIONS

Kadirvel et al., "Design and Characterization of MEMS Optical Microphone for Aeroacoustic Measurement," 42nd AIAA Aerospace Science Meeting and Exhibit, Jan. 5-8, 2004, Reno, Nevada.
Kageyama et al., "Acoustic emission monitoring of a reinforced concrete structure by applying new fiber-optic sensors," Smart Mater. Struct., vol. 14, No. 3, pp. S52-S59, 2005.
Kanskar et al., "Observation of leaky slab modes in an air-bridged semiconductor waveguide with a two-dimensional photonic lattice," Appl. Phys. Lett., vol. 70, No. 11, p. 1438-40, Mar. 1997.
Karathanos, V., "Inactive Frequency Bands in Photonic Crystals," Journal of Modern Optics, vol. 45, No. 8, pp. 1751-1758, 1998.
Kersey et al., "Fiber grating sensors", J. Lightwave Tehnol., vol. 15, No. 8, p. 1442-62, Aug. 1997.
Kersey, A.D., "Optical fiber sensors for permanent downwell monitoring applications in the oil and gas industry," IEICE Trans. on Electronics, vol. E83-C, No. 3, 400-404, 2000.
Kilic et al., "Miniature photonic-crystal hydrophone optimized for ocean acoustics," The Journal of the Acoustical Society of America, vol. 129, No. 4, 2011, pp. 1837-1850.
Kilic et al., "Analysis of guided-resonance-based polarization beam splitting in photonic-crystal slabs," J. Opt. Soc. Am. A, vol. 25, No. 11, pp. 2680-2692, Nov. 2008.
Kilic et al., "Asymmetrical spectral response in fiber Fabry-Perot interferometers," J. Lightwave Technol. 28, 8 pages, 2009.
Kilic et al., "External fiber Fabry-Perot acoustic sensor based on photonic-crystal mirror," in 18th International Optical Fiber Sensors Conference, Cancun, Mexico, 2006; published in Measurement Science and Technology (2007) vol. 18, pp. 3049-3054.
Kilic et al., "Fiber-optical acoustic sensor based on a photonic-crystal diaphragm," in 15th International Conference on Solid-State Sensors, Actuators, and Microsystems, Denver, CO, Jun. 21-25, 2009.
Kilic et al., "Photonic crystal slabs demonstrating strong broadband suppression of transmission in the presence of disorders," Opt. Lett. vol. 29, No. 23, 2782-2784, Dec. 1, 2004.
Kilic et al., "Photonic-crystal-diaphragm-based fiber-tip hydrophone optimized for ocean acoustics," in 19th International Optical Fiber Sensors Conference, Perth, Australia, 2008.
Kim et al., "Micromachined Fabry-Perot cavity pressure transducer," IEEE Photon. Technol. Lett., vol. 7, No. 12, pp. 1471-1473, Dec. 1995.
Kim et al., "Single-film broadband photonic crystal micro-mirror with large angular range and low polarization dependence," in Conference on Lasers and Electro-Optics (CLEO), Baltimore, MD, CThP7, 2007.
Kuhnel et al., "A silicon condenser microphone with structured back plate and silicon nitride membrane," Sensors and Actuators A, vol. 30, 251-258, 1992.
Kuzmenko, P.J., "Experimental Performance of a Miniature Fabry-Perot Fiber Optic Hydrophone," Proceedings of 8th Optical Fiber Sensors Conference, Monterey, California, Jan. 29-31, 1992, pp. 354-357.
Ladabaum et al., "Surface micromachined capacitive ultrasonic transducers, Ultrasonics, Ferroelectrics and Frequency Control," IEEE Transactions, vol. 45, No. 3, pp. 678-690, May 1998.
Lee et al., "Fiber-optic Fabry-Perot temperature sensor using a low-coherence light source," J. Lightwave Technol., vol. 9, No. 1, pp. 129-134, Jan. 1991.
Lee et al., "Interferometric optical fibre sensors using internal mirrors," Electron. Lett., vol. 24, No. 4, pp. 193-194, Feb. 18, 1988.
Levy et al., "Engineering space-variant inhomogeneous media for polarization control," Opt. Lett., vol. 29, No. 15, 1718-20, Aug. 1, 2004.
Lima et al., "Intrinsic and extrinsic fiber Fabry-Perot sensors for acoustic detection in liquids," Microwave and Optical Technology Letters, vol. 52, No. 5, May 2010, pp. 1129-1134.
Majumder et al., "Fibre Bragg gratings in structural health monitoring—Present status and applications," Sensors and Actuators A: Physical, vol. 147, 2008, pp. 150-164.
Mala et al., "Flow characteristics of water in microtubes," Int. J. Heat Fluid Flow 20, 142-148, 1999.
Marcuse et al., "Coupling efficiency of front surface and multilayer mirrors as fiber-end reflectors," J. Lightwave Technol., vol. LT-4, No. 4, pp. 377-381, 1986.
Marcuse, D., "Loss analysis of single-mode fiber splices," Bell Syst. Tech. J., vol. 56, No. 5, pp. 703-718, May-Jun. 1977.
Marin et al., Acoustic modes of a dual-core square-lattice photonic crystal fiber preform, Proc. 27th Eur. Conf. on Opt. Comm. (ECOC'01—Amsterdam), pp. 518-519, 2001.
Mellen, R.H., "The thermal-noise limit in the detection of underwater acoustic signals," J. Acoust. Soc. Am. vol. 24, No. 5, 478-480, Sep. 1952.
Mellow et al., "On the sound field of an oscillating disk in a finite open and closed circular baffle," J. Acoust. Soc. Am. vol. 118, No. 3, Pt. 1, 1311-1325, Sep. 2005.
Morey et al., "Multiplexing fiber Bragg grating sensors," Fiber and Integrated Optics, vol. 10, pp. 351-360, 1991.
Morris, P., "A Fabry-Perot fiber-optic ultrasound hydrophone for simultaneous measurement of temperature and acoustic pressure," J. of Acoust. Soc. of Am., vol. 125, No. 6, pp. 3611-3622, 2009.
Murphy et al., "Quadrature phase-shifted, extrinsic Fabry-Perot optical fiber sensors," Opt. Lett., vol. 16, No. 4, pp. 273-275, Feb. 15, 1991.
Nessaiver et al., "Recording High Quality Speech During Tagged Cine-MRI Studies Using a Fiber Optic Microphone," Journal of Magnetic Resonance Imaging, vol. 23, No. 783, 2006, pp. 92-97.
Ochiai et al., "Dispersion relation and optical transmittance of a hexagonal photonic crystal slab," Phys. Rev. B, vol. 63, p. 125107-1-125107-7, 2001.
Pacradouni et al., "Photonic band structure of dielectric membranes periodically textured in two dimensions," Phys. Rev. B, vol. 62, No. 7, p. 4204-07, Aug. 15, 2000.
Paddon et al., "Two-dimensional vector-coupled-mode theory for textured planar waveguides," Phys. Rev. B, vol. 61, No. 3, p. 2090-2101, Jan. 15, 2000.
Pedersen et al., "On the mechanical behaviour of thin perforated plates and their application in silicon condenser microphones," Sens. Actuators A, vol. 54, 499-504, 1996.
Petuchowski et al., "A sensitive fiber-optic Fabry-Perot interferometer," IEEE J. Quantum Electron., vol. 17, No. 11, pp. 2168-2170, Nov. 1981.
Rands et al., "Characterization of transition to turbulence in microchannels," Int. J. Heat Mass Transfer 49, 2924-2930, 2006.
Rugar et al., "Improved fiber-optic interferometer for atomic force microscopy," Applied Physics Letters, vol. 55, No. 25, Dec. 18, 1989 pp. 2588-2590.
Sharp et al., "Transition from laminar to turbulent flow in liquid filled microtubes," Exp. Fluids 36, 741-747, 2004.
Sharpe et al., "Effect of specimen size on Young's modulus and fracture strength of polysilicon," J. Micromech. Syst. vol. 10, No. 3, 317-326, Sep. 2001.
Škvor, "On acoustical resistance due to viscous losses in the air gap of electrostatic transducers," Acustica, vol. 19, 295-299, 1967-1968.
Spillman, Jr., et al., "Moving Fiber-Optic Hydrophone," Optics Lett., vol. 5, No. 1, pp. 30-31, Jan. 1980.
Starr, J.B., "Squeeze-film damping in solid-state accelerometers," in IEEE Workshop in Solid-State Sensor and Actuator 4th Technical Digest, pp. 44-47, 1990.
Suh et al., "Mechanically switchable photonic crystal structures based on coupled photonic crystal slabs", SPIE, Jul. 9, 2004, Photonic Crystal Materials and Devices II, Jan. 26-29, 2004, San Jose, CA USA, pp. 299-306, vol. 5360, No. 1.
Suh et al., "Displacement-sensitive photonic crystal structures based on guided resonance in photonic crystal slabs," Appl. Phys. Lett., vol. 82, No. 13, pp. 1999-2001, Mar. 31, 2003.
Szymanski et al., "Killer whale (*Orcinus orca*) hearing: Auditory brainstem response and behavioral audiograms," J. Acoust. Soc. Am. vol. 106, No. 2, 1134-1141, Aug. 1999.
Teledyne Reason, "TC4032," http://www.teledyne-reson.com/hydrophones/tc-4032/, 2005.

(56) References Cited

OTHER PUBLICATIONS

Thomson et al., "A Fabry-Perot acoustic sensor vibration detector-application to acoustic holography," J. Phys. D.: Appl. Phys., vol. 6, p. 677, 1973.
Timoshenko et al., "Theory of Plates and Shells," McGraw-Hill, 1959.
Totsu et al., "Ultra-Miniature Fiber-Optic Pressure Sensor Using White Light Interferometry," J. Micromech. Microeng., vol. 15, pp. 71-75, 2005.
Wang et al., "Fiber-optic chemical sensors and biosensors (2008-2012)," Analytical chemistry, vol. 85, No. 2, Nov. 9, 2012, pp. 487-508.
Wang et al., "Miniature all-silica optical fiber pressure sensor with an ultrathin uniform diaphragm.," Optics Express, vol. 18, No. 9, Apr. 26, 2010, pp. 9006-9014.
Wang et al., "Optical pressure/acoustic sensor with precise Fabry-Perot cavity length control using angle polished fiber," Opt. Express, vol. 17, No. 19, 16613-16618, 2009.
Wenz, G.M., "Acoustic ambient noise in the ocean: Spectra and sources," J. Acoust. Soc. Am. vol. 34, No. 12, 1936-1956, Dec. 1962.
Worth, R.A., "Accuracy of the parallel-plate analogy for representation of viscous flow between coaxial cylinders," J. Appl. Polym. Sci. 24, 319-328, 1979.
Wu et al., "Single-crystal silicon photonic-crystal fiber-tip pressure sensors," J. Microelectromechanical Syst., vol. 24, No. 4, 968-975, 2015.
Xu et al., "Fiber-optic acoustic pressure sensor based on large-area nanolayer silver diaphragm," Optics Letter, vol. 39, No. 10, May 15, 2014, pp. 2838-2840.
Xu et al., "High-sensitivity Fabry-Perot interferometric pressure sensor based on a nanothick silver diaphragm," Opt. Lett., vol. 37, No. 2, 133-135, 2012.
Yu et al., "Acoustic Measurements Using a Fiber Optic Sensor System," J. Intelligent Mat'l. Systems and Structures, vol. 14, pp. 409-414, Jul. 2003.
Yu et al., "Fiber Fabry-Perot sensors for detection of partial discharges in power transformers", Applied Optics Optical Society of America, vol. 42, No. 16, Jun. 1, 2003, pp. 3241-3250.
Yu, M., "Fiber-Optic Sensor Systems for Acoustic Measurements," Ph.D. Dissertation, University of Maryland, College Park, MD. 2002.
Zhu et al., "Miniature Fiber-Optic Pressure Sensor," IEEE Photonics Technology Letters, vol. 17, No. 2, 447-449, Feb. 2005.
International Search Report and Written Opinion dated Aug. 8, 2019 for PCT/US2019/023026.

\* cited by examiner

DIAPHRAGM-BASED FIBER ACOUSTIC SENSOR

CLAIM OF PRIORITY

This application is a divisional of U.S. application Ser. No. 16/358,469 filed Mar. 19, 2019 which claims the benefit of priority to U.S. Provisional Appl. No. 62/647,344, filed Mar. 23, 2018, both of which are incorporated in their entireties by reference herein.

STATEMENT REGARDING FEDERALLY SPONSORED R&D

This invention was made with Government support under Contract No. W911NF-16-C-0023 awarded by the Defense Advanced Research Projects Agency. The Government has certain rights in the invention.

BACKGROUND

Field

This application relates generally to sensor systems, and more particularly to optical-fiber-compatible acoustic sensor systems.

Description of the Related Art

Acoustic sensors are utilized in many applications ranging from oil and gas exploration (see, e.g., A. D. Kersey, "Optical fiber sensors for permanent downwell monitoring applications in the oil and gas industry," IEICE Trans. on Electronics, vol. E83-C, no. 3, 400-404, 2000), medical applications, such as ultrasound imaging (see, e.g., P. Morris, "A Fabry-Perot fiber-optic ultrasound hydrophone for simultaneous measurement of temperature and acoustic pressure," J. of Acoust. Soc. of Am., vol. 125, no. 6, pp. 3611-3622, 2009) and photo-acoustic tomography (PAT) (see, e.g., J. A. Guggenheim et al., "Ultrasensitive plano-concave optical microresonators for ultrasound sensing," Nature Photonics, vol. 11, no. 11, pp. 714-719, 2017), underwater communication, land, air, and water surveillance (see, e.g., D. Hill and P. Nash, "Fiber-optic hydrophone array for acoustic surveillance in the littoral," Photonics for Port and Harbor Security, 2005, pp. 1-10), and seismic monitoring (see, e.g., T. M. Daley et al., "Field testing of fiber-optic distributed acoustic sensing (DAS) for subsurface seismic monitoring," The Leading Edge, vol. 32, no. 6, pp. 699-706, 2013), and monitoring of large structures (see, e.g., K. Kageyama et al., "Acoustic emission monitoring of a reinforced concrete structure by applying new fiber-optic sensors," Smart Mater. Struct., vol. 14, no. 3, pp. S52-S59, 2005). Depending on the application, acoustic sensors have various bandwidths and sensitivities. For example, underwater applications utilize responses down to low frequencies (e.g., 1 Hz to 1 kHz) with a minimum detectable pressure (MDP) (e.g., in the range of 10-100 $\mu Pa/\sqrt{Hz}$), while ultrasonic detectors for PAT operate at much higher frequencies (e.g., 20-50 MHz) and have larger MDPs (e.g., in the range of 1-10 $mPa/\sqrt{Hz}$) and larger detection bandwidths.

Fiber optic acoustic sensors are well suited for these and other applications because they can be highly sensitive, compact, immune to electromagnetic interference, resistant to many harsh environments, and biocompatible. Promising breakthroughs in fiber acoustic sensors in the last decade have involved highly flexible diaphragms as the acoustic transducer. When exposed to an acoustic pressure, the diaphragm vibrates at the acoustic frequency, and the amplitude and frequency of this vibration are measured optically with one of several techniques. For example, phase-sensitive measurements utilizing a Fabry-Perot (FP) interferometer have utilized two flexible micromachined mirrors interrogated with a signal delivered by a multimode fiber (see, e.g., Y. Kim and D. P. Neikirk, "Micromachined Fabry-Perot cavity pressure transducer," IEEE Photon. Technol. Lett., vol. 7, no. 12, 1471-1473, 1995). Subsequent devices have implemented a simpler design in which the FP interferometer has a single reflective diaphragm placed close to a reflective fiber tip (see, e.g., D. S. Greywall, "Micromachined optical-interference microphone," Sensors Actuators A Phys., vol. 75, 257-268, 1999; M. J. Gander et al., "Embedded micromachined fiber-optic Fabry-Perot pressure sensors in aerodynamics applications," IEEE Sens. J., vol. 3, no. 1, 102-107, 2003; F. Xu et al., "High-sensitivity Fabry-Perot interferometric pressure sensor based on a nanothick silver diaphragm," Opt. Lett., vol. 37, no. 2, 133-135, 2012; L. H. Chen et al., "High performance chitosan diaphragm-based fiber-optic acoustic sensor," Sensors Actuators A Phys., vol. 163, no. 1, 42-47, 2010; W. Wang et al., "Miniature all-silica optical fiber pressure sensor with an ultrathin uniform diaphragm.," Opt. Express, vol. 18, no. 9, 9006-9014, 2010; W. Wang et al., "Optical pressure/acoustic sensor with precise Fabry-Perot cavity length control using angle polished fiber," Opt. Express, vol. 17, no. 19, 16613-16618, 2009; E. Cibula and D. Ðonlagic, "Miniature fiber-optic pressure sensor with a polymer diaphragm," Appl. Opt., vol. 44, no. 14, 2736-2744, 2005).

SUMMARY

In certain embodiments, a sensor comprises at least one optical waveguide configured to emit light in a direction, the at least one optical waveguide having a mode-field diameter greater than 11 µm. The sensor further comprises an optical reflector optically coupled to the at least one optical waveguide, the optical reflector configured to reflect at least a portion of the light. The optical reflector comprises a first portion configured to reflect a first portion of the light back to the at least one optical waveguide. The optical reflector further comprises a second portion configured to reflect a second portion of the light back to the at least one optical waveguide. The second portion of the optical reflector is responsive to a perturbation by moving relative to the first portion of the optical reflector. The reflected second portion of the light differs in phase from the reflected first portion of the light by a phase difference that is not substantially equal to an integer multiple of $\pi$ when the second portion of the optical reflector is in an equilibrium position in absence of the perturbation.

In certain embodiments, a sensor comprises at least one optical waveguide configured to emit a light beam. The sensor further comprises an optical reflector optically coupled to the at least one optical waveguide, the optical reflector configured to be illuminated by the light beam and to reflect at least a portion of the light beam to the at least one optical waveguide. The optical reflector comprises a first substrate portion configured to reflect a first portion of the light beam back to the at least one optical waveguide. The optical reflector further comprises a diaphragm configured to reflect a second portion of the light beam back to the at least one optical waveguide. The diaphragm is responsive to a perturbation by moving relative to the first substrate portion.

The light beam is centered on a region between the first substrate portion and the diaphragm.

DETAILED DESCRIPTION

Figure 1A:
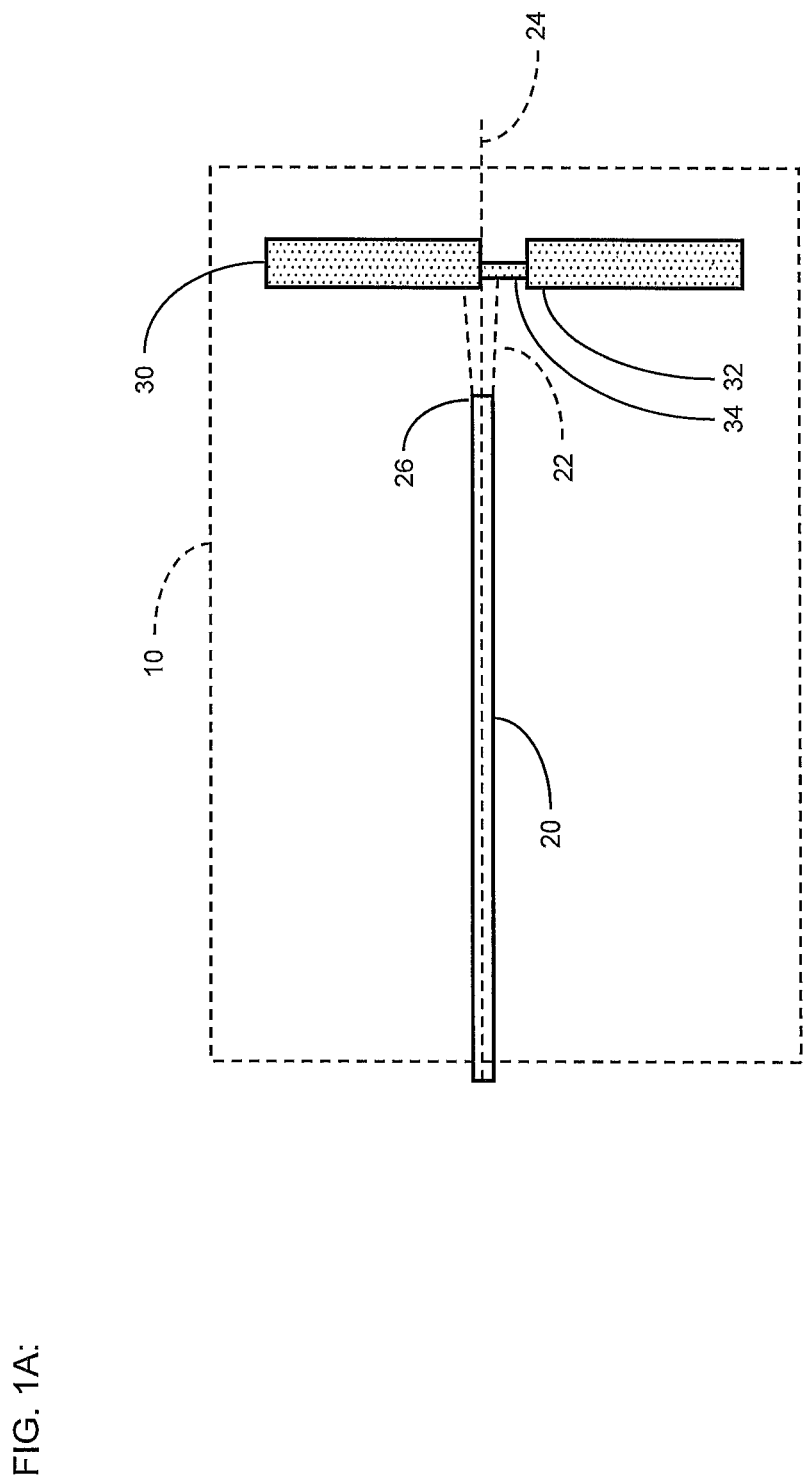
FIG. 1A schematically illustrates an example optical sensor in accordance with certain embodiments described herein.

One issue with acoustic sensors based on Fabry-Perot (FP) interferometry has been their relatively high minimum detectable pressures (MDPs) (e.g., from 1 mPa to hundreds of Pa), mostly due to the high stiffness of the diaphragm and/or low FP finesse. The sensitivity has been improved dramatically by improving the reflectivity of the two reflective surfaces by fabricating a photonic crystal on the diaphragm (see, e.g., X. Wu et al., "Single-crystal silicon photonic-crystal fiber-tip pressure sensors," *J. Microelectromechanical Syst.*, vol. 24, no. 4, 968-975, 2015), and coating the fiber tip with gold (see, e.g., O. Kilic et al., "Miniature photonic-crystal hydrophone optimized for ocean acoustics," *J. of the Ac. Soc. of Am.*, vol. 129, no. 4, 1837-1850, 2011; O. C. Akkaya et al., "Modeling and demonstration of thermally stable high-sensitivity reproducible acoustic sensors," *J. Microelectromechanical Syst.*, vol. 21, no. 6, 1347-1356, 2012) or a dielectric reflector (see, e.g., W. Jo et al., "Miniature fiber acoustic sensors using a photonic-crystal membrane," *Opt. Fiber Technol.*, vol. 19, no. 6, 785-792, 2013). Such improvements have been implemented in fiber hydrophones with a relatively flat measured response (e.g., between about 500 Hz and about 10 kHz), and an MDP of 12 μPa/√Hz at about 20 kHz; and fiber microphones applied to the detection of acoustic waves in air with a broad flat-band (e.g., 600 Hz to 10 kHz) and an average MDP of 2.6 μPa/√Hz between 1 and 30 kHz.

A previously reported phase-front-modulation (PFM) acoustic sensor (W. Jo et al., "Highly sensitive phase-front-modulation fiber acoustic sensor," *J. of Lightwave Technol.*, Vol. 33, No. 20, 4377-4383, 2015) utilized a free-space laser beam emitted from a single-mode fiber and propagating through a graded-index (GRIN) lens that focused the laser beam onto a reflective silicon chip placed a short noncritical distance (e.g., a few mm) from the lens. The laser beam illuminated (e.g., irradiated) a square, optical-quality planar surface of the chip in which a circular well with a microfabricated planar bottom surface that was hundreds of nanometers thick and acted as a deformable diaphragm. The incident beam was centered on the well and wider than the well, so that a central beam portion was incident on the well while an outer beam portion was incident on the edges of the well. The depth of the well was $\lambda/8$, where $\lambda$ is the optical wavelength of the incident beam, so that the two portions of the reflected beam were in quadrature. The reflected beam was sent back through the lens and focused onto the fiber core. Because of the intentional phase mismatch between the inner and outer portions, about 50% of the beam power was coupled into the single-mode fiber core mode. When a dynamic pressure at frequency $f_a$ was incident on the reflective chip, the diaphragm vibrated with respect to the thicker and stationary outer portion of the chip at frequency $f_a$, which modulated the power recoupled into the fiber's fundamental mode at $f_a$. A measurement of this power modulation provided the pressure and frequency of the applied pressure. Compared to an FP-based sensor, the PFM acoustic sensor had a much broader (predicted to be, e.g., about ±150 nm) choice of probe wavelength, a looser tolerance on the fiber-to-diaphragm distance, and a comparable MDP for equal diaphragm dimensions. The sensitivity spectrum of the PFM acoustic sensor had a flat band (e.g., that extended from as low as 100 Hz up to about 10 kHz) and an MDP that was 16 μPa/√Hz at 1 kHz and was 5.4 μPa/√Hz on average over the measurement range.

This previously reported PFM acoustic sensor performed well, but suffered from some limitations. The diaphragm was clamped at its edges, so the diaphragm bowed when exposed to an acoustic pressure, such that the displacement of the diaphragm was maximum at its center but was zero at its edges. As a result, a high acoustic sensitivity was achieved by having the laser beam diameter greater than the diaphragm diameter and centered on the center of the diaphragm so that the beam illuminates (e.g., irradiates) the entire diaphragm and some of the surrounding substrate. In addition, to produce a large displacement in the presence of a small acoustic pressure, the diaphragm had a large diameter (e.g., about 1 mm), and consequently the beam diameter was even larger (e.g., greater than about 1 mm). The beam diameter was achieved by imaging the laser beam emerging from the fiber with the optical lens (e.g., a GRIN lens) of large focal length. For example, the acoustic sensor had a diaphragm diameter of 760 μm and utilized an incident beam with a diameter of 1.2 mm, emitted from a lens having a 6-mm focal length and by positioning the fiber tip about 6 mm from the diaphragm. With such large optical magnification, high tolerance control of the angular alignment of the chip, difficult to reproduce in practice, was used in aligning the chip with respect to the fiber for good recoupling of the reflected beam. For example, a tilt of 0.07 degree between the surface normal of the chip and the fiber axis produced a calculated 50% decrease in the recoupled power and a similar decrease in optical sensitivity.

Certain embodiments described herein utilize phase-front modulation without an optical lens between the fiber and the diaphragm, advantageously relaxing the tolerance on the angular alignment between the fiber and the diaphragm and making the assembly more reproducible. In certain embodiments described herein, the acoustic sensor has a measured sensitivity about 3.9 times higher than that of the previously-reported PFM acoustic sensor (see, W. Jo et al., "Highly sensitive phase-front-modulation fiber acoustic sensor," *J. of Lightwave Technol.*, Vol. 33, No. 20, 4377-4383, 2015) and has about the same MDP at 1 kHz (13.5 μPa/√Hz).

Certain embodiments described herein provide a compact fiber sensor that utilizes phase-front modulation to detect acoustic waves at extremely low pressures. In certain embodiments, the sensor can utilize a reflective diaphragm with a π/2 phase step microfabricated in a silicon wafer, combined with an optical fiber having a large mode-field diameter (e.g., greater than 11 μm), to form a simple interferometric sensor head. In certain embodiments, the sensor can present several advantages over state-of-the-art, high-sensitivity, diaphragm-based, fiber Fabry-Perot sensors, including but not limited to, easier optical alignment and less sensitivity to alignment between the optical fiber and the diaphragm, smaller temperature dependence, lower sensitivity to mode-field diameter size which relaxes fabrication tolerances, simpler fabrication and assembly, avoiding utilizing a lens between the fiber end and the reflector, lower sensitivity to the angular alignment between the fiber and the reflector, making alignment easier, simpler, and faster to achieve. In certain embodiments, the sensor has a great potential in various areas, including in vivo pressure monitoring, surveillance, seismic research, structural health monitoring, photoacoustic imaging, stem cell research, and in sensor array networks for oil and gas exploration.

Figure 1B:
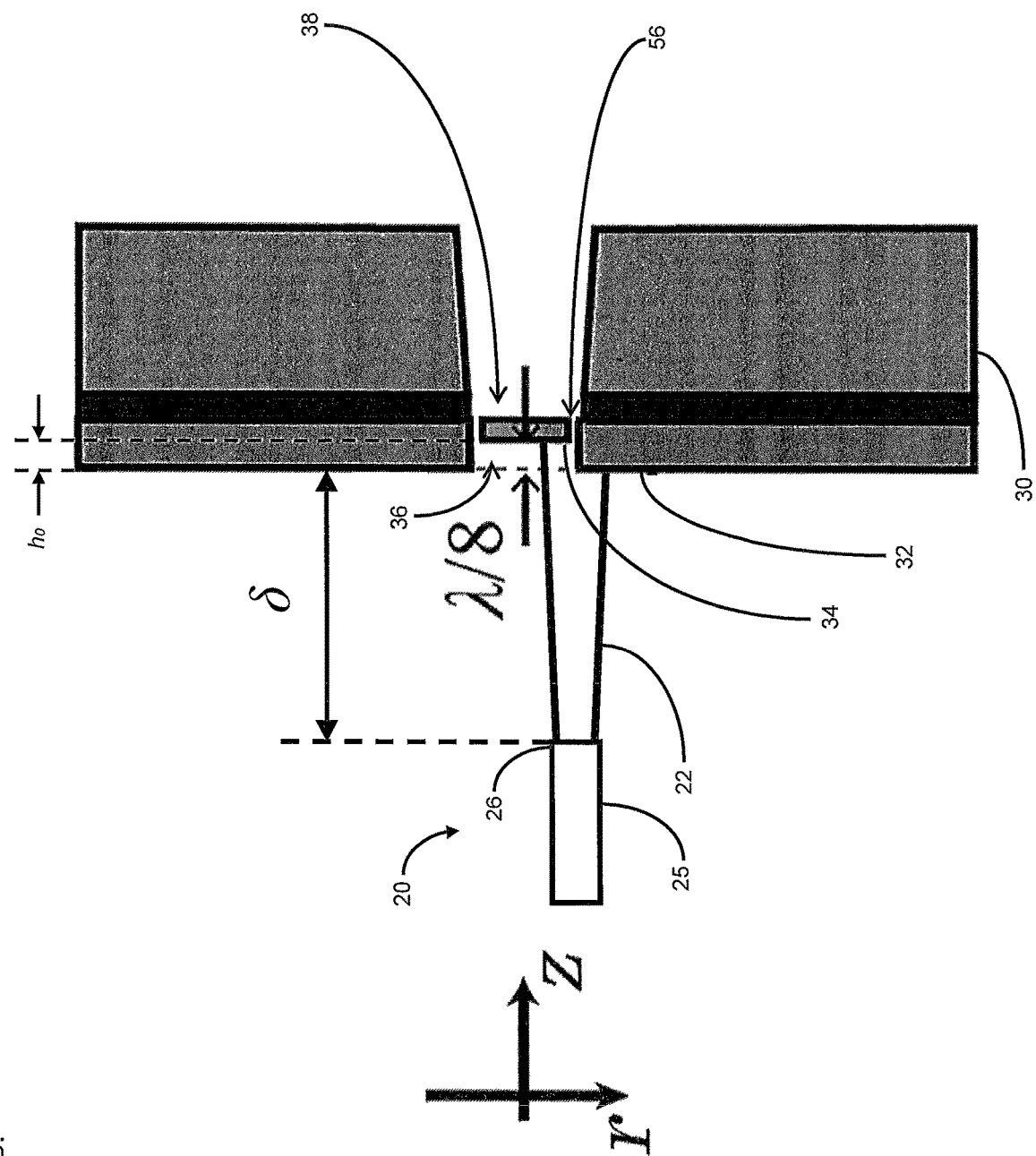
FIG. 1B schematically illustrates a cross-section of an optical reflector in accordance with certain embodiments described herein.

FIGS. 1A and 1B schematically illustrate an example sensor 10 in accordance with certain embodiments described herein. While the example sensor 10 is described herein in the context of sensing acoustic pressure waves, various embodiments described herein may more generally be described as comprising a displacement sensor which is responsive to selected perturbations (e.g., acoustic pressure waves, magnetic fields, electric fields, accelerations, other forces) by having two or more portions displaced relative to one another and by providing one or more signals indicative of information regarding one or more aspects of the perturbations (e.g., magnitude, frequency, waveform).

The sensor 10 of FIG. 1A comprises at least one optical waveguide 20 configured to emit light 22 in a direction 24. The at least one optical waveguide 20 has a mode-field diameter greater than 11 μm. The sensor 10 can further comprise an optical reflector 30 optically coupled to the at least one optical waveguide 20. The optical reflector 30 is configured to reflect at least a portion of the light 22 and comprises a first portion 32 of the optical reflector 30 and a second portion 34 of the optical reflector 30. The first portion 32 of the optical reflector 30 (e.g., a first surface) is configured to reflect a first portion of the light back to the at least one optical waveguide 20. The second portion 34 of the optical reflector 30 (e.g., a second surface parallel to a first surface of the first portion 32 of the optical reflector 30) is configured to reflect a second portion of the light back to the at least one optical waveguide 20. The second portion 34 of the optical reflector 30 is responsive to a perturbation (e.g., a pressure wave incident on the sensor 10) by moving relative to the first portion 32 of the optical reflector 30. The second portion 34 of the optical reflector 30 is offset from the first portion 32 of the optical reflector 30 along the direction 24 such that the reflected second portion of the light differs in phase from the reflected first portion of the light by a phase difference that is not substantially equal to an integer multiple of it when the second portion 34 of the optical reflector 30 is in an equilibrium position in absence of the perturbation. For example, a maximum sensitivity can be achieved in certain embodiments in which the phase difference is substantially equal to an odd integer multiple of π/2 (e.g., ±π/2, ±3π/2, ±5π/2). As used herein, the phrase "substantially equal to" as used in describing the phase difference refers to phase differences that are within ±10% of the cited value (e.g., within ±5% of the cited value, within ±2% of the cited value).

In certain embodiments, the phase difference has a magnitude that is in at least one of the following ranges: substantially greater than zero and substantially less than π, substantially greater than π and substantially less than 2π, and substantially greater than 2π and substantially less than 3π. In certain embodiments, the phase difference has a magnitude that is in at least one of the following ranges: substantially greater than zero and less than or equal to π/2, greater than or equal to π/2 and substantially less than π, substantially greater than π and less than or equal to 3π/2, greater than or equal to 3π/2 and substantially less than 2π, substantially greater than 2π and less than or equal to 5π/2, and greater than or equal to 5π/2 and substantially less than 3π. As used herein, the phrase "substantially greater than" as used in describing the ranges of the phase difference magnitude refers to phase difference magnitudes that are greater than 102% of the cited value (e.g., greater than 105% of the cited value, greater than 110% of the cited value). As used herein, the phrase "substantially less than" as used in describing the ranges of the phase difference magnitude refers to phase difference magnitudes that are less than 98% of the cited value (e.g., less than 95% of the cited value, less than 90% of the cited value). As used herein, the phrase "substantially greater than zero" as used in describing the ranges of the phase difference magnitude refers to phase difference magnitudes that are greater than π/8. In certain embodiments, the phase difference is selected to provide an amount of sensitivity that is adequate for the purposes for which the sensor 10 is being used.

The normalized optical sensitivity σ of the sensor 10, for a given wavelength λ and depth of the well $h_0$ (e.g., distance between the top surface of the diaphragm 38 and the top surface of the first portion 32) can be expressed as:

$$\sigma = -\frac{2\pi}{\lambda}\sin\left(\frac{4\pi}{\lambda}h_0\right). \qquad (1)$$

Using Eq. (1), the sensor 10 has the highest sensitivity when $h_0$ equals any integer multiple of $\lambda/8$. The maximum sensitivity is then equal to $\sigma_{max} = \pm 2\pi/\lambda$. At such values of $h_0$, the sensor 10 has a very weak wavelength dependence, such that the wavelength $\lambda$ can vary as much as $\pm 10\%$ and the sensitivity $\sigma$ will remain within $\pm 10\%$ of the maximum sensitivity value $\sigma_{max}$.

Furthermore, by operating as a two-wave interferometer, the dependence of the sensor 10 on the linewidth of the laser is only manifested in the laser frequency noise. The noise in the sensor 10 $N_f$ induced by laser frequency noise, with linewidth $\Delta v$ and speed of light c, can be expressed as:

$$N_f = \sqrt{\frac{\Delta v}{\pi} \frac{d\sigma}{d\lambda} \frac{d\lambda}{dv}} = \sqrt{\frac{\Delta v}{\pi} \left(\frac{2\pi h_0}{\lambda^2}\right)\left(\frac{\lambda^2}{c}\right)} = \sqrt{\frac{4\pi h_0^2 \Delta v}{c^2}}. \quad (2)$$

As shown in Eq. (2), the induced noise $N_f$ due to the laser frequency noise scales as the square root of the linewidth (e.g., $\sqrt{\Delta v}$) and is proportional to the well depth $h_0$ thus is negligible, even in MHz regions.

In certain embodiments, the performance of the sensor 10 is independent of the polarization of light 22, though the use of polarization maintaining fibers will not degrade the performance of the sensor 10.

In certain embodiments, the at least one optical waveguide 20 has a mode-field diameter greater than 11 µm (e.g., greater than 12 µm; greater than 15 µm; greater than 17 µm; in a range between 12 µm and 45 µm; in a range between 15 µm and 40 µm; in a range between 20 µm and 40 µm; in a range between 17 µm and 35 µm). As schematically illustrated by FIG. 1B, the at least one optical waveguide 20 comprises at least one optical fiber 25 configured to emit light 22 that propagates towards the optical reflector 30. In certain embodiments, the optical fiber 25 is configured to emit the light 22 as a light beam from an end 26 of the optical fiber 25, the light beam having a divergence angle less than 2.3 degrees (for an LMA fiber) or in a range of 2.3 degrees to 5.4 degrees (for an SMF fiber). The optical fiber 25 can be further configured to receive reflected light from the optical reflector 30, the reflected light comprising a first reflected portion from the first portion 32 of the optical reflector 30 and a second reflected portion from the second portion 34 of the optical reflector 30. In certain embodiments, the at least one optical fiber 25 comprises at least one large mode area (LMA) optical fiber, at least one tapered optical fiber (e.g., a tapered portion of a single-mode fiber, such as an SMF-28 fiber), and/or at least one photonic-crystal fiber. Example LMA fibers compatible with certain embodiments described herein can be obtained from Nufern Inc. of East Granby Conn., nLIGHT Inc. of Vancouver Wash., and NKT Photonics of Denmark. Example photonic-crystal fibers compatible with certain embodiments described herein are available from NKT Photonics of Denmark and Thorlabs of Newton N.J. Example tapered optical fibers compatible with certain embodiments described herein can be made using SMF fiber from Corning Inc. of Corning N.Y. In certain embodiments, the at least one LMA fiber has a numerical aperture of 0.06, a core radius of 10 µm, and a cladding radius of 200 µm. In certain embodiments, the at least one photonic-crystal fiber has a numerical aperture of 0.06, a core radius of 12.5 µm, and a cladding radius of 129 µm. In certain embodiments, the at least one tapered fiber has a numerical aperture of 0.14, a core radius of 1.1 µm, and a cladding radius of 17.5 µm.

As schematically illustrated by FIG. 1B, the optical reflector 30 (e.g., comprising a wafer) can be placed a short, non-critical distance (e.g., 30 µm-100 µm) from the end 26 of the at least one optical fiber 25. In certain embodiments, the optical reflector 30 comprises at least one of the following materials: silicon, silicon nitride, silicon carbide, graphite, graphene. The reflector 30 can comprise a first portion 32 that is optically reflective. For example, the first portion 32 can comprise an optically-reflective first surface (e.g., an optical-quality planar surface of the wafer, a metal layer) or an optically-reflective structure (e.g., a photonic-crystal structure or a dielectric stack).

In certain embodiments, the reflector 30 further comprises a region 36 bounded at least in part by the first portion 32. For example, the region 36 can comprise a well microfabricated into the wafer (e.g., having a planar bottom surface that comprises the second portion 34 and that is a depth $h_0$ below the surface of the first portion 32), as schematically illustrated by FIG. 1B. In certain embodiments, the distance between the first portion 32 and the second portion 34 (e.g., the depth $h_0$ of the region 36) is approximately equal to $\lambda/8$ (e.g., equal to $\lambda/8$ to within $\pm 10\%$, $\pm 5\%$, or $\pm 2\%$), where $\lambda$ is the wavelength of the light 22 (e.g., $\lambda = 1.55$ µm or other near-infrared wavelength), and can the region 36 can have a perimeter in a plane parallel to the first surface of the first portion 32 that is circular, square, rectilinear, triangular, or another shape. In certain embodiments, the perimeter of the well can be surrounded by the first portion 32 or can be bounded on one, two, or more sides by the first surface of the first portion 32.

In certain embodiments, the second portion 34 of the reflector 30 comprises a diaphragm 38 in the region 36 (e.g., at the bottom of the well). The diaphragm 38 can be significantly thinner (e.g., by hundreds of nanometers) than portions of the wafer surrounding the diaphragm 38 such that the diaphragm 38 is elastically movable and/or elastically deformable in response to the perturbation. In certain embodiments, the diaphragm 38 can have a shape in a plane parallel to the first surface of the first portion 32 that is circular, square, rectilinear, triangular, or another shape. The diaphragm 38 can comprise the second portion 34, which can include a reflective second surface in the region 36 (e.g., at the bottom of the well) or an underlying reflective layer in the region 36 (e.g., beneath a surface of the bottom of the well).

In certain embodiments, the light 22 from the at least one optical waveguide 20 is positioned and has a width such that a first portion of the light 22 is incident on the first portion 32 of the reflector 30, while a second portion of the light 22 is incident on the second portion 34 of the reflector 30 (e.g., the diaphragm 38 in the well). In certain embodiments, the ratio of the optical power of the first portion of the light 22 to the optical power of the second portion of the light 22 is in a range between 0.3 and 0.7, in a range between 0.4 and 0.6, or in a range between 0.45 and 0.55. For example, the optical power of the first portion of the light 22 can be approximately equal to the optical power of the second portion of the light 22 (e.g., within $\pm 10\%$; within $\pm 5\%$; within $\pm 2\%$).

In certain embodiments, as schematically illustrated by FIGS. 1A and 1B, the light 22 can have a width that is less than or equal to a width of the well and can be positioned such that the light 22 illuminates only a fraction of the area of the second portion 34 (e.g., illuminates less than all of the whole bottom area of the well; illuminates only a portion of the perimeter of the well) and illuminates at least some of the first portion 32 of the reflector 30. For example, the light 22 can be off-center relative to the well and the first portion of the light 22 can be incident on the first portion 32 of the reflector 30 outside the well, while the second portion of the light 22 is incident on the second portion 34 of the reflector 30 (e.g., the diaphragm 38 in the well). In certain embodiments, the light 22 is centered on an edge of the diaphragm 28 or on the gap 56 between the diaphragm 28 and the adjacent first portion 32 of the reflector 30.

The light reflected from the first portion 32 of the reflector 30 and the second portion 34 of the reflector 30 can form a reflected beam of light that is returned to the at least one optical waveguide 20. In certain embodiments, the ratio of the optical power reflected from the first portion 32 of the reflector 30 and received by the optical fiber 25 to the optical power reflected from the second portion 34 of the reflector 30 and received by the optical fiber 25 is in a range between 0.3 and 0.7, in a range between 0.4 and 0.6, or in a range between 0.45 and 0.55. For example, the optical power reflected from the first portion 32 of the reflector 30 and received by the optical fiber 25 can be approximately equal to the optical power reflected from the second portion 34 of the reflector 30 and received by the optical fiber 25 (e.g., within ±10%; within ±5%; within ±2%).

Figure 1C:
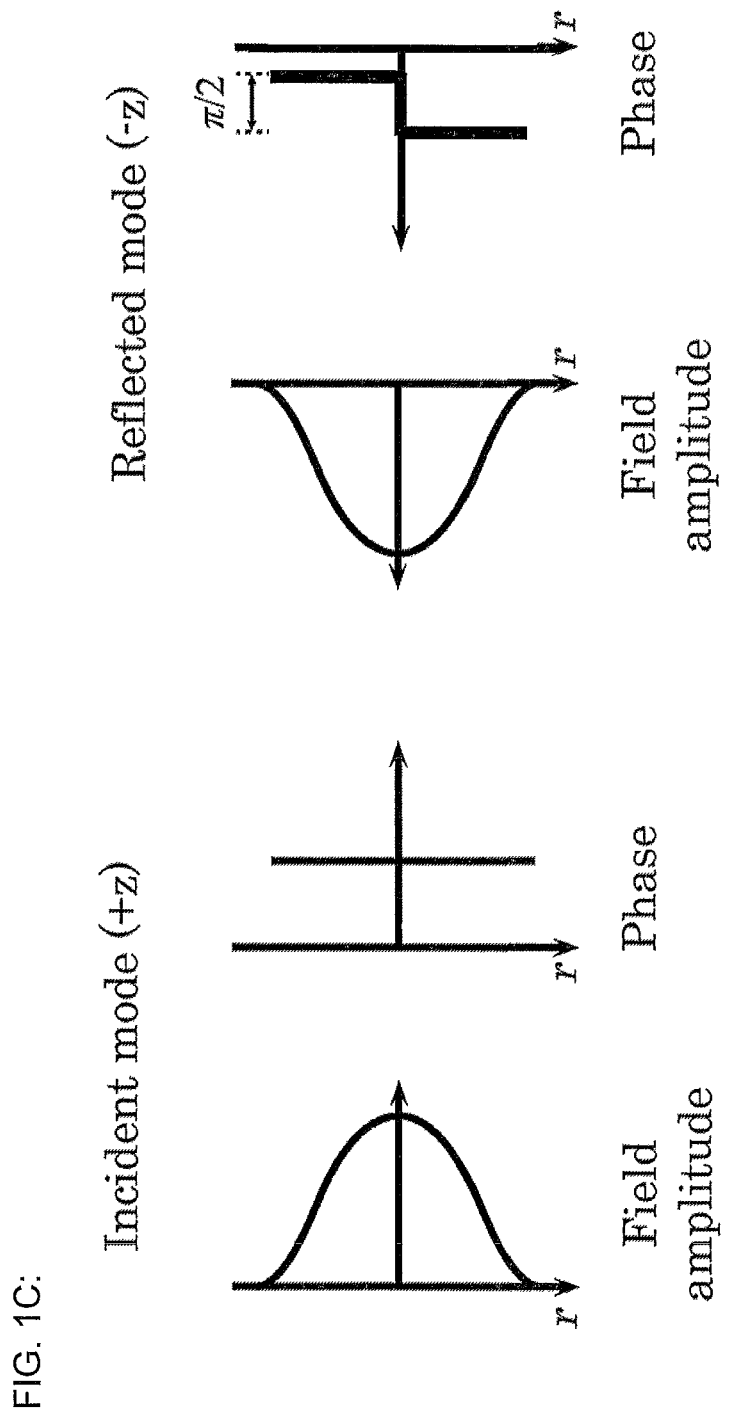
FIG. 1C schematically illustrates example phase fronts of the incident and reflected light in accordance with certain embodiments described herein.

In certain embodiments, the depth of the well (e.g., one-eighth of the wavelength of the light, which can be expressed as $\lambda/8$) can be selected such that after reflection in the absence of a perturbation (e.g., in an equilibrium position of the diaphragm 38), the two reflected portions of the light are in quadrature, as schematically illustrated by FIG. 1C. The reflector 30 can be oriented perpendicular to the direction 24 of the light 22 so that the reflected beam is received by the core of the optical fiber 25 of the at least one optical waveguide 20. Because of the intentional phase mismatch between the two portions of the reflected light, the reflected light received by the at least one optical waveguide 20 (e.g., by the core of the optical fiber 25) does not couple well into the optical fiber 25 (e.g., the ratio $P_{out}/P_{in}$ of the optical power $P_{out}$ recoupled into the optical fiber 25 to the optical power $P_{in}$ emitted towards the diaphragm 38 from the optical fiber 25 equals about 50%).

When a perturbation (e.g., a static acoustic pressure) is incident on the reflector 30, the diaphragm 38 is displaced with respect to the thicker outer portion of the reflector 30. For example, the diaphragm 38 can be displaced (e.g., with respect to the stationary first portion 32 of the reflector 30) in a direction substantially perpendicular to the second portion 34 of the reflector 30 (e.g., the reflective surface of the diaphragm 38). This displacement from the equilibrium position of the diaphragm 38 modifies the relative phase between the two portions of the reflected light, which changes the coupling efficiency of the reflected light to the at least one optical waveguide 20 (e.g., into the core mode of the optical fiber 25), and thus changing the optical power returning from the sensor 10. A measurement of this power change can provide the magnitude of the perturbation (e.g., the value of the applied pressure). The principle is the same for a dynamic pressure at frequency $f_a$. The diaphragm 38 then vibrates at frequency $f_a$, the returning signal is modulated at $f_a$, and the measurement can provide both the amplitude and frequency of the pressure wave.

In certain embodiments, the depth of the well of the region 36 of the reflector 30 is selected to provide the preselected phase difference between the two reflected portions of light. However, in certain other embodiments, other structural attributes (e.g. materials, structures) of the region 36 and of the first portion 32 of the reflector 30 can be selected to provide the preselected phase difference between the two reflected portions. For example, one or both of the region 36 and the first portion 32 can have an appropriate photonic-crystal structure, including appropriate materials, to provide the preselected phase difference between light reflected from the region 36 and light reflected from the first portion 32.

Figure 1D:
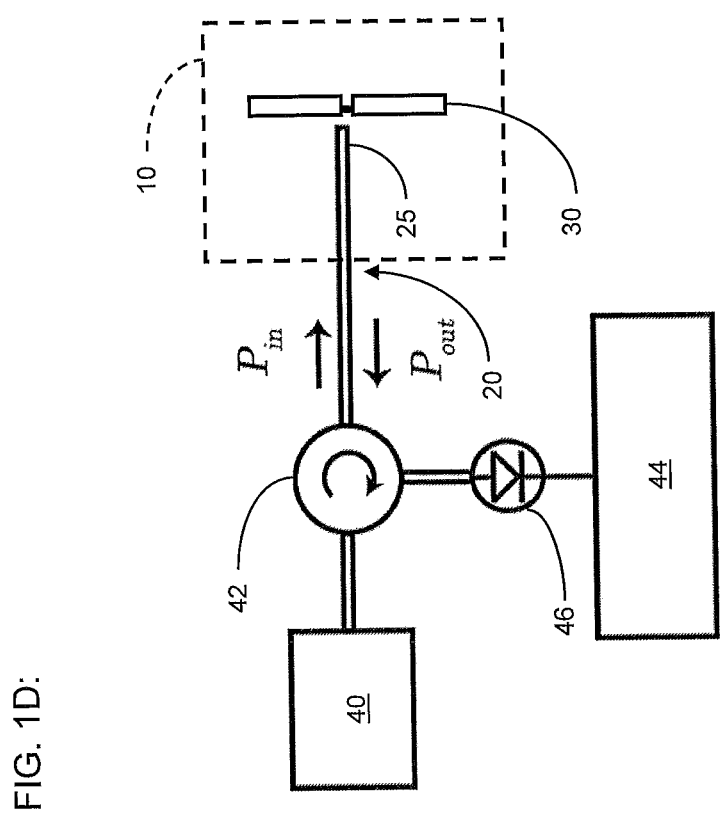
FIG. 1D schematically illustrates another example optical sensor in accordance with certain embodiments described herein.

In certain embodiments, as schematically illustrated by FIG. 1D, at least one laser 40 can generate light having at least one wavelength and can be optically coupled to the at least one optical waveguide 20 via at least one optical coupler 42 (e.g., an optical circulator) to provide light having a power level of $P_{in}$ to an input of the at least one optical waveguide 20. The at least one optical coupler 42 can be further optically coupled to a photo-detector 46 such that light having a power level $P_{out}$ emitted from the input of the at least one optical waveguide 20 is provided to the photo-detector 46. In certain embodiments, as schematically illustrated by FIG. 1D, the signal from the photo-detector 46 is transmitted to an optical analyzer 44 (e.g., comprising a dynamic signal analyzer, a lock-in amplifier, and/or a data acquisition unit). In certain embodiments, the at least one optical waveguide 20 is part of an integrated optical circuit that uses the at least one optical waveguide 20 to transport input optical signals to the optical reflector 30 and to transport reflected optical signals from the optical reflector 30 (e.g., to an optical analyzer 44).

Figure 2A:
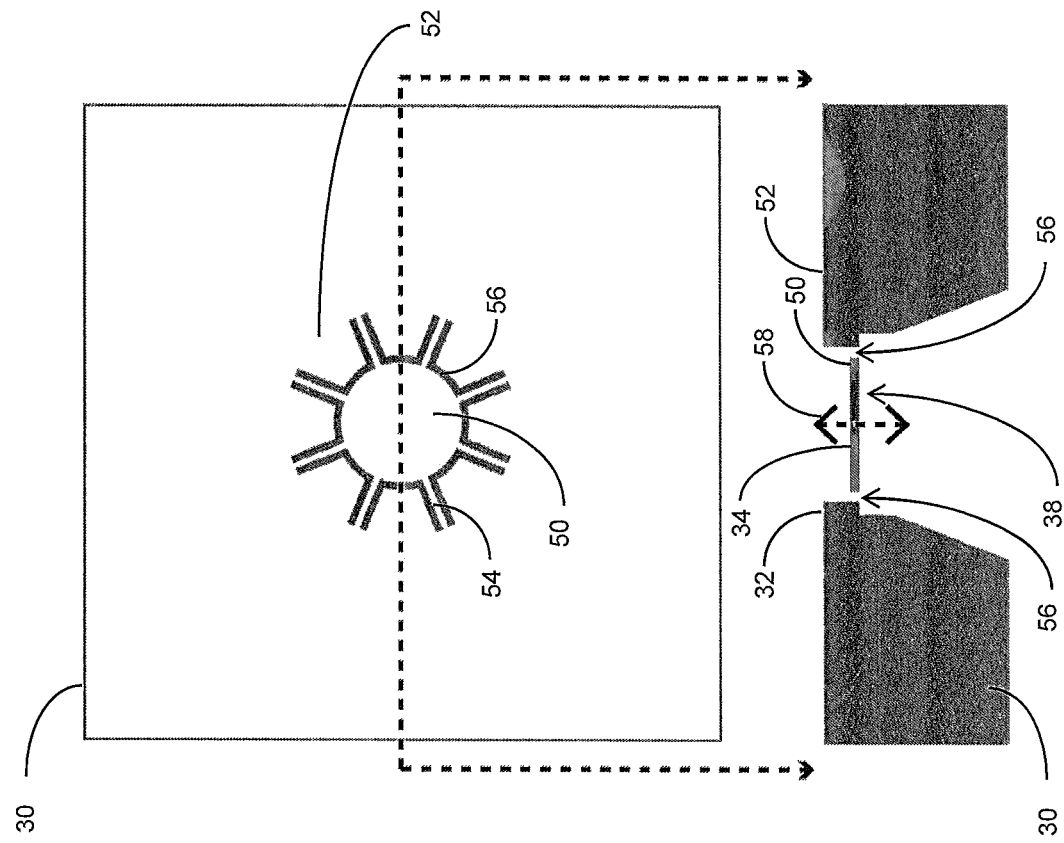
FIG. 2A schematically illustrates an example optical reflector in accordance with certain embodiments described herein.
Figure 2B:
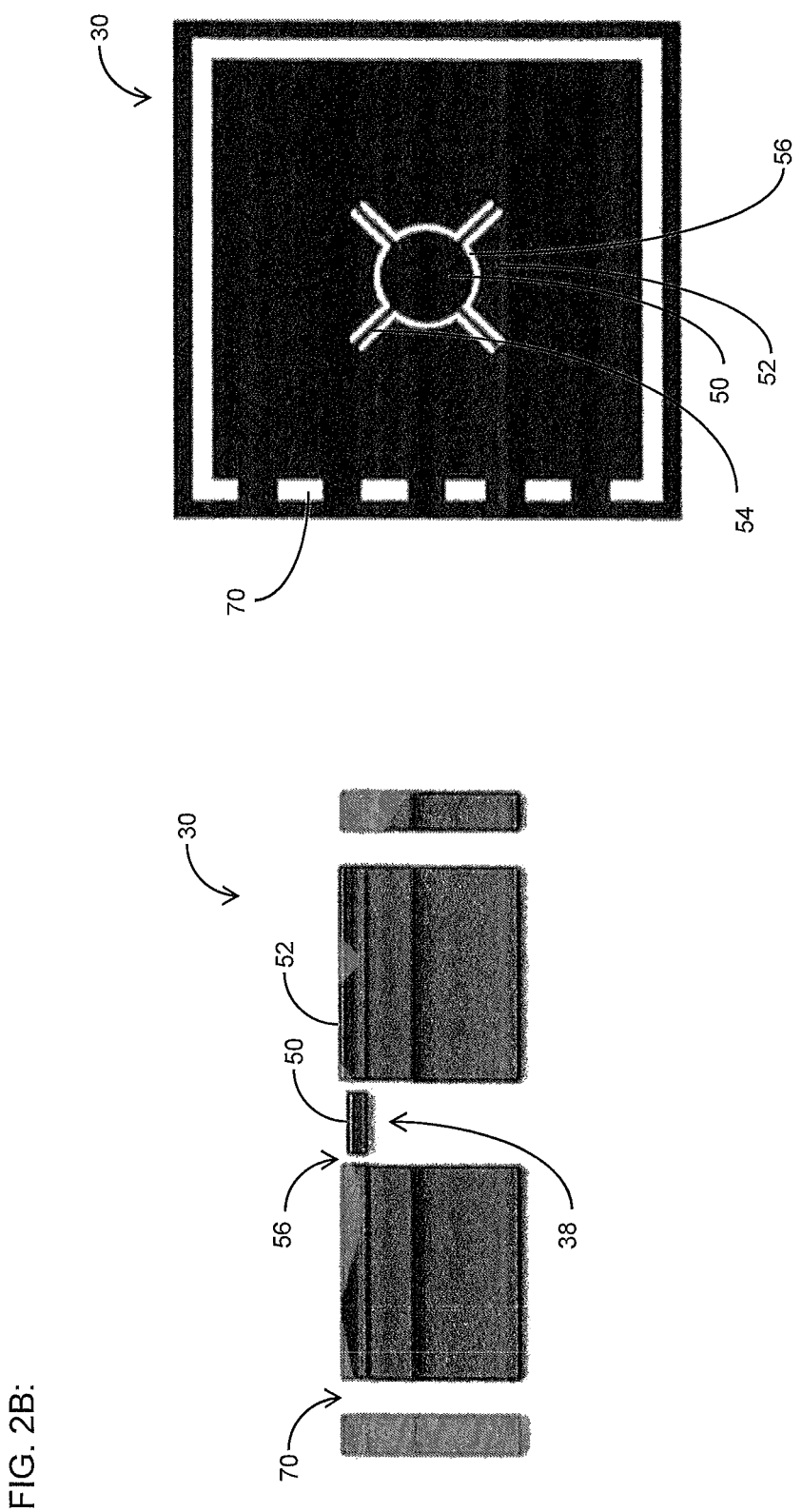
FIG. 2B schematically illustrates an example reflector in accordance with certain embodiments described herein.

FIGS. 2A and 2B schematically illustrate two example reflectors 30 (e.g., formed from a silicon-on-insulator wafer) in accordance with certain embodiments described herein. In FIG. 2A, the example reflector 30 has eight spring structures 54 and is schematically shown in a top view (the top portion of FIG. 2A) and in a cross-sectional view (the bottom portion of FIG. 2A) along the dashed line of the top portion. In FIG. 2B, the example reflector 30 has four spring structures 54 and is schematically shown in a cross-sectional view (the left side of FIG. 2B) and in a top view (the right side of FIG. 2B).

Each of the example reflectors 30 of FIGS. 2A and 2B comprises a movable portion 50 (e.g., a diaphragm 38 of the second portion 34 of the reflector 30), a non-movable portion 52 comprising the first portion 32 of the reflector 30, and a plurality of spring structures 54 mechanically coupled to the movable portion 50 and to the non-movable portion 52. While the example reflector 30 of FIG. 2A has eight spring structures 54 and the example reflector 30 of FIG. 2B has four spring structures 54, other reflectors 30 with 2, 3, 5, 6, 7, 9, 10, or more spring structures 54 are also compatible with certain embodiments described herein. The movable portion 50 and the plurality of spring structures 54 can be defined (e.g., separated from the non-movable portion 52) by a plurality of gaps 56 cut into the example reflector 30 (e.g., using microfabrication techniques). The example reflector 30 is configured to have the movable portion 50 vibrate by translating in a direction 58 that is generally perpendicular to the movable portion 50 (e.g., the diaphragm 38) while the movable portion 50 generally retains its shape (e.g., planar), and while the spring structures 54 elastically stretch and move.

The perforations 70 along the left portion of the structure shown on the right side of FIG. 2B can be used to separate the example reflector 30 from the surrounding portion of the wafer at the appropriate stage of fabrication. The example reflector 30 can have various sizes, shapes, and thicknesses in accordance with certain embodiments described herein. In FIGS. 2A and 2B, a generally circular diaphragm 38 comprises the moving portion 50 that is mechanically coupled to the surrounding non-moving portion 52 (e.g., the surrounding portions of the wafer) by the plurality of spring structures 54 (e.g., elongate structures that are configured to distort elastically such that the diaphragm 38 translates in a direction that is generally perpendicular to the plane of the diaphragm 38).

Various sizes of reflectors 30, diaphragms 38, and spring structures 54 with various compliances can be used. For example, various sizes of generally circular diaphragms 38 (with radius a=100 µm, 110 µm, 120 µm, 130 µm, 140 µm, 150 µm, 160 µm, 170 µm, 180 µm, or 190 µm) with various thicknesses (e.g., in a range between 0.3 µm to 1.5 µm; 0.45 µm; 1.1 µm), and with various compliances (e.g., spring constants) can be fabricated (e.g., at the same time). Other sizes and shapes of the diaphragm 38 and the spring structures 54, number of spring structures 54, arrangements of spring structures 54, compliance of the spring structures 54 may be used in accordance with certain embodiments described herein.

There are many possible modifications that can be made to improve the sensitivity and usability of the acoustic sensor 10 for different applications in accordance with certain embodiments described herein. For example, different types of reflectors 30 can be implemented at the sensor surface. It can be desirable to maximize the reflectivity of the sensor surface because the sensitivity is proportional to the reflectivity. For example, a gold coating can be used on the first portion 32 and/or the second portion 34 of the reflector 30 to achieve reflectivity of about 70% or greater (e.g., 98% or greater). The reflectivity can be increased using different high-reflection coatings such as silver, aluminum, and dielectrics. Also, a photonic-crystal bandgap structure can be fabricated for the sensor diaphragm 38 and the rest of sensor surface, which can increase its reflectivity (e.g., up to about 99%). For another example, the diaphragm shape is not limited to a circular shape, and it can be fabricated in other desirable shapes (e.g., rectangular). In certain embodiments, the spring structures 54 can be simple elongate structures that are configured to stretch, while in certain other embodiments, other spring structures 54 (e.g., spiral springs, folded springs) can be used to suspend the movable portion 50 (e.g., the sensor diaphragm 38).

In certain embodiments, since the movable portion 50 of the example reflector 30 generally translates (e.g., uniformly displacing in a direction generally perpendicular to its surface, with the same displacement at its center and at its edges) without distortion of its shape, the example reflector 30 can advantageously provide freedom to select a size and thickness of the movable portion 50 independently of the stress-responsive properties of the movable portion 50. Thus, an acoustic sensor 10 utilizing the example reflector 30 in certain embodiments can be optimized for the use of various beam sizes and pressure levels.

As a result, certain embodiments provide significant practical benefits compared to previous configurations of phase-front-modulation sensors. In certain embodiments in which the displacement of the diaphragm 38 is probed by a light beam that has a lateral width smaller than that of the diaphragm 38 and that straddles the edge of the diaphragm 38 (e.g., the second portion 34) and the substrate adjacent to it (e.g., the first portion 32)(see, e.g., FIG. 1B), the sensor 10 does not utilize a lens between the fiber end 26 and the reflector 30. In certain embodiments, the design of the sensor 10 is significantly simpler, with fewer components, so the sensor 10 is consequently easier to assemble. In certain embodiments in which the light beam illuminating the reflector 30 has a much smaller diameter than does the diaphragm 38, the coupled optical power is much less sensitive to the angular alignment between the fiber 25 and the reflector 30, making alignment easier and faster to achieve. In certain embodiments, the light beam can probe any portion of the edge of the diaphragm 38, instead of having to be perfectly centered on the diaphragm 38, which simplifies the alignment process. In certain embodiments, the optical sensitivity is nominally independent of the light beam size, greatly relaxing fabrication tolerances.

Furthermore, in certain embodiments, the spring structures 54 advantageously are used to control the mechanical compliance of the diaphragm 38, which determines the amplitude of the diaphragm motion for a given applied pressure and frequency. The mechanical compliance of certain such embodiments is not dependent on the diameter of the diaphragm 38 but on the stiffness and/or the dimensions of the spring structures 54 and the number of spring structures 54. As a result, the diaphragm 38 does not have to be very large to provide satisfactory mechanical compliance (e.g., a large motion for a small pressure).

Referring back to FIG. 1B, in certain embodiments, the distance δ between the end 26 of the optical fiber 25 and the reflector 30 is optimized in view of two opposing mechanisms. For values of the distance δ that are too small, squeezed-film damping between the fiber end 26, including the physical structure that supports the fiber 25, and the reflector 30 can restrict motion of the diaphragm 38, thereby reducing the mechanical response of the sensor 10 and its overall sensitivity to pressure (e.g., acoustic waves). For values of the distance δ that are too large, the percentage of recoupled power η will be reduced (because the total distance traveled by the beam, 2δ, is larger, and as a result of diffraction the diameter of the reflected beam incident on the fiber 25 is larger), and the optical sensitivity will be reduced. In certain embodiments, the distance δ is selected to optimize (e.g., maximize) the sensitivity of the sensor 10 (e.g., the distance δ is in a range of about 30 µm; 30 µm to 100 µm).

In certain embodiments in which a small distance δ is used (e.g., distance δ equal to 30 µm), the optical waveguide 20 is selected to have a mode-field diameter greater than 11 µm to achieve a sufficient level of recoupled optical power into the optical waveguide 20. If the optical waveguide 20 comprises a single-mode-fiber (e.g., SMF-28 fiber) having a mode-field diameter of 10.4 µm, the diameter of the light beam emitted from the fiber end 26 diffracts (e.g., has a divergence angle) and expands from 10.4 µm at the fiber end 26 to about 15.4 µm after propagating to the reflector 30 and returning back to the fiber end 26, and about 38.5% of the optical power is recoupled into the fiber 25, not including the effect of the air gaps 56 between the diaphragm 38 and the adjacent substrate portion of the reflector 30, which is reasonably high (e.g., without diffraction, it would be 50%, as discussed herein). However, the diameter of the light beam impinging the reflector 30 is about 11.8 µm, and this relatively small spot size has two consequences. First, a larger fraction of the optical power incident on the reflector 30 falls on the air gap 56 between the diaphragm 38 and the adjacent substrate portion of the reflector 30, and is thus not reflected back to the fiber 25. As a result, the recoupled optical power is reduced by about 34%. Second, a smaller light beam can be more difficult to align laterally so that it covers both the diaphragm 38 and the adjacent substrate portion of the reflector 30 with equal optical powers. Due to these two limitations, the recoupled optical power using a single-mode-fiber (e.g., SMF-28 fiber) having a mode-field diameter of 10.4 µm is reduced to 25.4% compared to 50% with no gap 56 and no diffraction and a step size of λ/8).

In certain embodiments, using an optical waveguide 20 (e.g., comprising an LMA fiber, a tapered optical fiber, or a photonic-crystal fiber) that supports a fundamental mode with a large mode-field diameter (MFD) advantageously overcomes this diffraction loss and loss of optical power through the gap 56. In certain embodiments, the MFD (e.g., greater than 11 µm; greater than 12 µm; greater than 15 µm; greater than 17 µm; in a range between 12 µm and 45 µm; in a range between 15 µm and 40 µm; in a range between 20 µm and 40 µm; in a range between 17 µm and 35 µm is sufficiently large so as to advantageously provide a large percentage of the optical power recoupled back to the optical waveguide 20 (e.g., greater than 80%; greater than 85%; greater than 90%; greater than 95%; greater than 98%). For example, an optical waveguide 20 having an MFD equal to 23 µm can provide a light beam with a Rayleigh length of about 270 µm (e.g., assuming that the region between the fiber 25 and the reflector 30 is filled with a gas or a vacuum, and that the wavelength λ=1.55 µm), which advantageously provides nearly 100% of the reflected optical power recoupled back into the fundamental mode of the optical waveguide 20 (e.g., assuming a distance of 30 µm between the fiber end 26 and the reflector 30, the percentage of light lost though the gap 56 is small (e.g., around 14.3%), and the lateral alignment of the fiber 25 relative to the reflector 30 is easier, while the angular alignment of the fiber 25 relative to the reflector 30 is a little more stringent (e.g., by about a factor of 4.9).

For large values of the MFD, the light beam 22 launched into free-space will have a larger Rayleigh length and will diffract more slowly as it propagates towards the diaphragm 38. For example, for a distance between the fiber end 26 and the reflector 30 that is a fraction of the output light beam's Rayleigh length, the diameter of the reflected light beam at the fiber end 26 closely matches the diameter of the light beam 22 emitted from the fiber end 26. Therefore, for a set distance between the fiber end 26 and the reflector 30, the re-coupling loss back into the optical waveguide 20 decreases as the MFD of the optical waveguide 20 increases. For an optical fiber 25 having a core radius α and a normalized fiber frequency parameter V (e.g., the V number), the MFD can be expressed as:

$$MFD = 2w_0 = a\left(0.65 + \frac{1619}{V^{15}} + \frac{2.879}{V^6}\right), \quad (3)$$

where the normalized frequency parameter V for the same optical fiber 25 having a numerical aperture NA can be expressed as:

$$V = \frac{2\pi}{\lambda} a \cdot NA. \quad (4)$$

In certain embodiments, the MFD can be increased by decreasing the V number (e.g., below 1) by decreasing the core radius a, which, based on Eq. (3) and (4), will further increase the MFD as the core radius a is decreased further (e.g., while maintaining a V number that is smaller than 2.4 to have single-mode operation). For example, the optical waveguide 20 can comprises a single-mode fiber (e.g., SMF-28 fiber) that has an NA of 0.14 and a fiber end 26 that is tapered adiabatically down to a fiber core diameter equal to about 2.2 µm, such that the V number is equal to about 0.65, and the MFD of the fiber 25 is increased from 10.4 µm (untapered) to 23 µm (tapered). Other values of the core radius a and V number are also compatible with certain embodiments described herein.

In certain embodiments in which the fiber core radius is extensively decreased, the core essentially vanishes and the electric field is guided in a cladding mode by the fiber cladding. In certain such embodiments, the mode field is guided within the cladding, with radius $r_{cl}$, and a surrounding, lower index medium (such as air). The V number, based on Eq. (4), increases due to the larger cladding radius guiding the mode to values much greater than unity. Based on Eq. (3), with large V numbers, the MFD will depend predominantly on the first term and thus approaches 1.3 times the cladding radius, $r_{cl}$ which in turn reduces the MFD emerging from the fiber. For example, adiabatically tapering an SMF-28 fiber with an original core diameter of 8.2 µm and a cladding diameter of 125 µm to a core diameter of 1 µm and cladding diameter of 15.2 µm, surrounded by air, results in a cladding mode with a V number of 32.7 (based on Eq. (4)) and an MFD of 9.9 µm based on Eq. (3).

In certain embodiments, a sufficiently large MFD can be provided by a large-mode-area (LMA) fiber having an appropriate combination of core radius α and V number according to Eq. (4), which is equivalent, for a given wavelength of operation, to selecting the appropriate combination of core radius α and numerical aperture NA. For example, an LMA fiber with core radius α=14.5 µm and NA=0.04 at 1.55 µm will have V=2.35 and MFD=32.4 µm. In certain embodiments, the LMA fiber (e.g., MFD in the range of 20 µm-40 µm) is optically coupled to the SMF-28 fiber pigtail (MFD=10.4 µm) of the circulator 42 by a mode-converter configured to image the MFD of the SMF-28 fiber to match that of the LMA fiber (e.g., using various imaging setups or using intermediary tapered fibers to adiabatically increase/decrease the MFD between the SMF-28 fiber and the LMA fiber), as opposed to a simple butt-coupling or splice which would suffer from significant loss due to mode mismatch, effectively reducing the optical sensitivity of the sensor and degrading its performance.

In certain embodiments, a sufficiently large MFD can be provided by a photonic-crystal fiber (e.g., MFD of about 20 µm) which can be a single-mode fiber. In certain embodiments, the photonic-crystal fiber is optically coupled to the SMF-28 fiber pigtail of the circulator 42 by a mode converter.

In certain embodiments, the frequency response of the sensor 10 is dependent on the air flow through the inside of the sensor 10 (e.g., by the shape and volume of the enclosure behind the optical waveguide 20). For example, at low frequencies, the air inside the sensor 10 housing surrounding the optical waveguide 20 has time to flow through the air gaps 56 around the diaphragm 38 and the spring structures 54, which reduces the pressure differential between the two sides of the diaphragm 38, and thus reduces the sensor response at these low acoustic frequencies. To counterbalance this effect, in certain embodiments, the housing behind the optical waveguide 20 contains a sufficiently large volume of air, which increases the compressibility of the total volume of air, which in turn shifts the roll-off to lower frequencies. In certain embodiments, the sensor 10 comprises a back-chamber 86 with a volume of 1.25 cm³ (see, e.g., FIG. 3A), which places the 3-dB roll-off frequency at 70 Hz. For example, a back-chamber 86 with a volume ranging from 0.86 cm³ to 8.75 cm³ can place the 3-dB roll-off frequency at 100 Hz and 10 Hz respectively.

Example Sensor and Fabrication

Figure 3A:
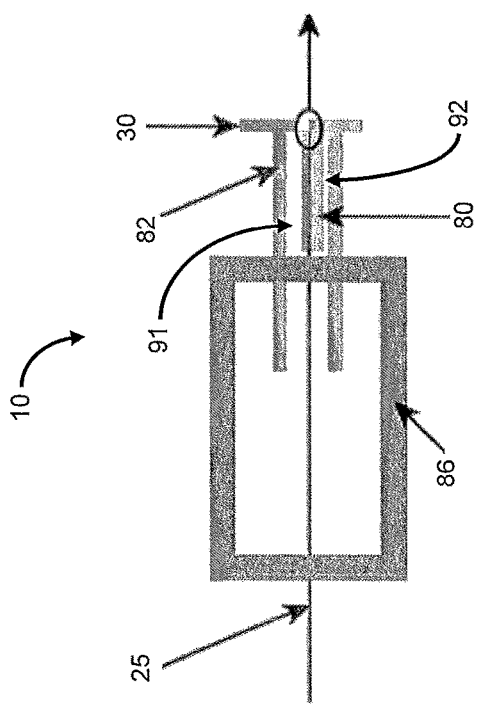
FIGS. 3A-3D schematically illustrate an example sensor with an example reflector in accordance with certain embodiments described herein.
Figure 3B:
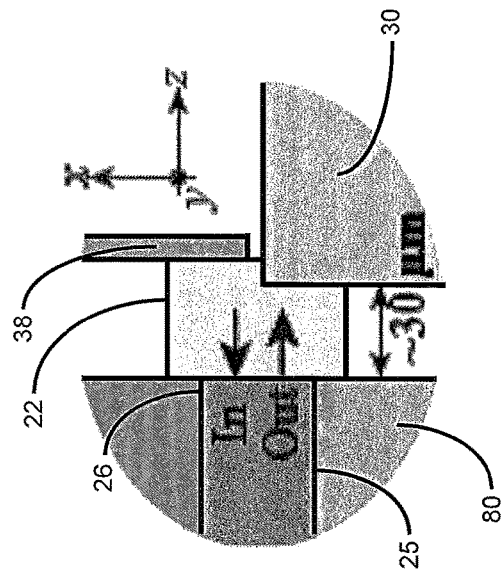
Figure 3C:
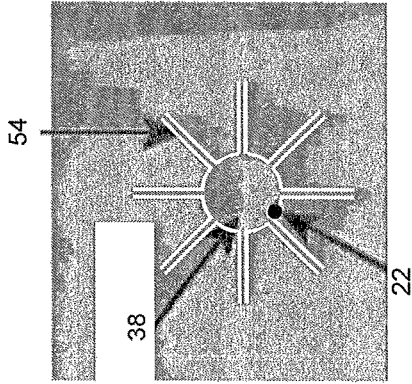

FIGS. 3A-3D schematically illustrate an example sensor 10 with an example reflector 30 in accordance with certain embodiments described herein. A sensor 10 compatible with FIGS. 3A-3D was fabricated at Stanford Nanofabrication Facility on a 4-inch silicon-on-insulator (SOI) wafer with a 7-μm optically flat device layer, a 1-μm box layer, and a 450-μm substrate layer. The example reflector 30 included a portion of a microelectromechanical system (MEMS) chip having a circular diaphragm 38 suspended at the center of a substrate by a set of eight cantilever spring structures 54, as schematically illustrated by FIG. 3C. Fabrication utilized conventional CMOS technology and clean-room techniques and equipment.

Figure 3D:
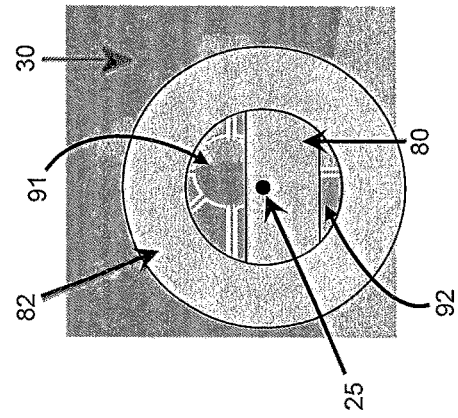

As schematically illustrated in FIGS. 3A and 3D, the example sensor 10 comprises two channels 91, 92 (e.g., air channels) above and below an inner ferrule 80, respectively, and within an outer ferrule 82. The channels 91, 92 are configured to fluidly couple the small volume in the region between the optical fiber 25 and the reflector 30 to the much larger volume of the back-chamber 86, which in certain embodiments enables the low frequency roll-off to be shifted to lower frequencies. The channels 91, 92 act as acoustic masses in the example sensor 10 and add viscous losses due to Poiseuille flow, and in certain embodiments, the dimensions of the channels 91, 92 affect the acoustic response of the example sensor 10. In order to minimize these effects, wide and short channels are preferential. For example, the channels 91, 92 can have circular segment cross-sections with areas of 0.93 mm$^2$ and 0.48 mm$^2$, respectively, and a length of 5 mm. These channels 91, 92 can be designed using lumped-element modeling of the example sensor 10, such that their acoustic masses and viscous losses are negligible compared to other acoustic elements of the sensor 10, such as the diaphragm 38 and the back-chamber 86. Furthermore, the channels 91, 92 can be asymmetric to one another to minimize the overlap in area between diaphragm 38 and the inner ferrule 80, thus further reducing the squeezed-film damping. As shown in FIG. 3D, the channel 91 exposes the diaphragm 38 directly to the back-chamber 86.

Figure 4:
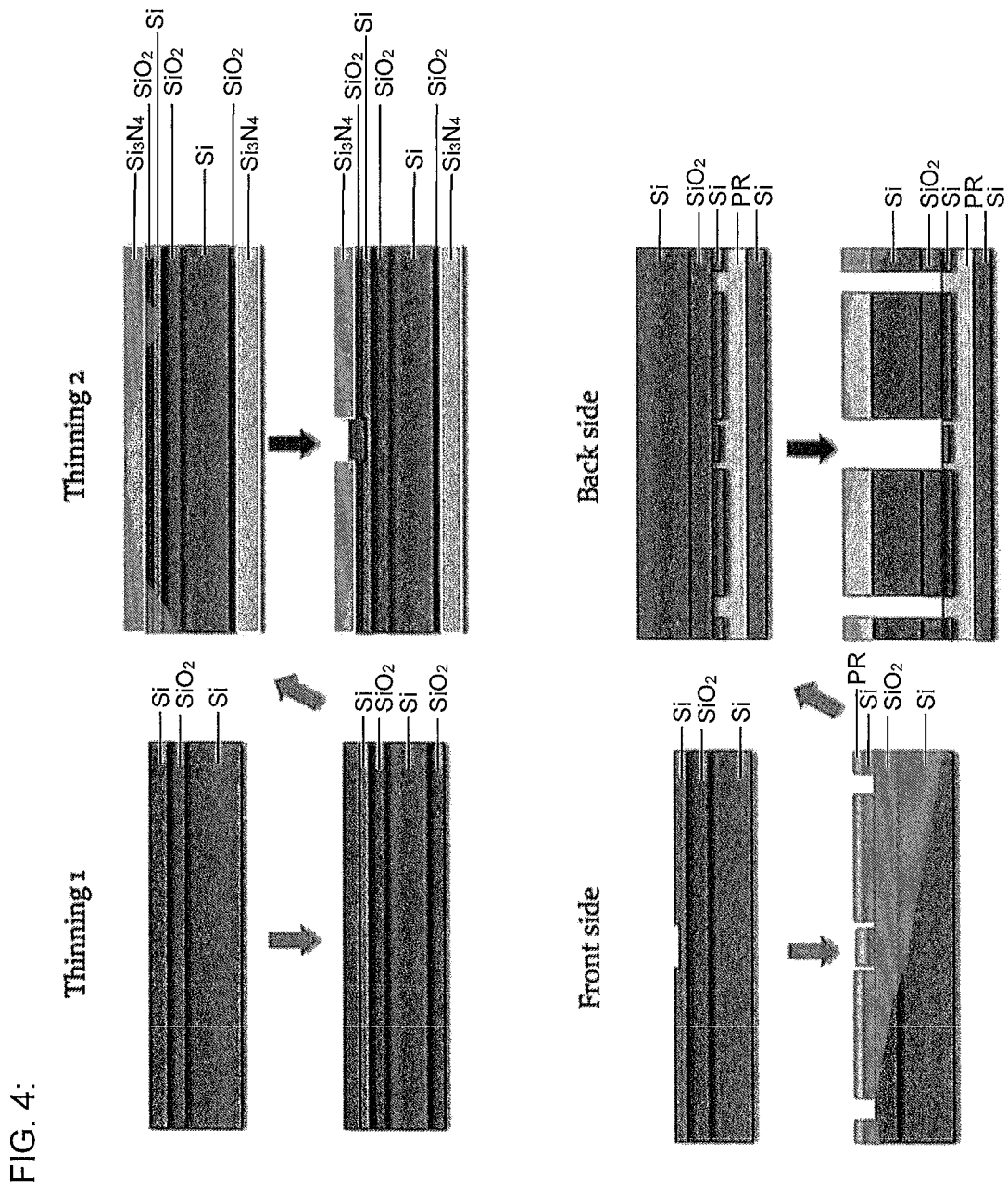
FIG. 4 schematically illustrates an example fabrication process of a reflector in accordance with certain embodiments described herein.

FIG. 4 schematically illustrates an example fabrication process of a reflector 30 in accordance with certain embodiments described herein. In certain embodiments, the fabrication process of the reflector 30 involves two steps of device thinning by thermal oxidation following a dry etching process (e.g., to define spring structures 54 and to release the movable portion 50 of the example reflector 30). The example fabrication process of FIG. 4 is compatible with fabricating the example reflector 30 (e.g., including defining the spring structures 54). For example, the diaphragms 38 were fabricated on the device layer first by thinning it to a thickness of 6.5 μm using thermal oxidation. Local oxidation of silicon (LOCOS) was then used to create the λ/8 step in the well structures. Using deep reactive ion etch (DRIE), the shapes of the diaphragms 38 were etched on the device layer. The wafer was then flipped, and the diaphragms 38, now suspended on the SiO$_2$ box layer, were exposed from the substrate layer using another DRIE step. The box layer was then removed by vapor hydrofluoric acid to fully release the diaphragms 38. Finally, the device layer was coated with a 7-nm thick chromium adhesion layer, and a 15-nm thick gold layer to increase its power reflectivity to a measured value of about 70%. The completed wafer contained 112 chips with diaphragms 38 of 300-μm radius and a thickness of 6.5 μm. Each diaphragm 38 was supported by eight identical cantilever spring structures 54 with a height and a width of 6.5 μm, and a length that varied from chip to chip between 380 μm and 580 μm.

A tapered optical fiber 25 (e.g., a tapered single-mode fiber, such as a tapered SMF-28 fiber) was bonded in an inner ferrule 80 (e.g., a silica capillary tube). The end 26 of the tapered optical fiber 25 was polished to obtain an optically flat surface perpendicular to the fiber axis. The inner ferrule 80 was inserted and positioned within an outer ferrule 82 (e.g., comprising silica) such that the fiber end 26 was spaced a distance of about 30 μm from the polished end of the outer ferrule 82, and the inner ferrule 80 was bonded to the outer ferrule 82. The reflector 30 was mounted on a five-axis micropositioner and was positioned in front of the fiber end 26 such that light 22 emitted from the fiber end was incident on the reflector 30, and the reflector 30 was aligned on two angular axes to maximize the optical power reflected by the reflector 30 that was coupled back into the fiber 25. The reflector 30 was then translated laterally until the light 22 incident on the reflector 30 was straddling the edge of the diaphragm 38. To fine-tune the alignment of the reflector 30 with respect to the fiber 25, a monotonic acoustic wave was launched onto the sensor 10, which at this point was sensitive to acoustic pressure, and the lateral position of the reflector 30 was adjusted to maximize the sensor's output signal. The aligned reflector 30 was then bonded to the polished end of the outer ferrule 82 such that the end 26 of the tapered optical fiber 25 was about 30 microns from an outer reflective surface of the reflector 30, as shown in FIG. 3B. The inner ferrule 80 and the outer ferrule 82 extended into and were sealed within the back-chamber 86. The inner ferrule 80 and the outer ferrule 82 (shown in the cross-sectional view of FIG. 3D) held the fiber 25 in position relative to the reflector 30 such that the light 22 emitted from the end 26 of the fiber 25 illuminated both the optically reflective diaphragm 38 and the optically reflective substrate portion of the reflector 30 adjacent to the diaphragm 38.

The sensor 10 operates as a two-wave interferometer with the MEMS spring-loaded diaphragm 38 transducing an incident acoustic wave into a vibration that is measured by the interferometer. When exposed to either an external pressure wave or a force, the diaphragm 38 is displaced relative to the stationary substrate in a direction perpendicular to the surface of the diaphragm 38 (e.g., towards and/or away from the end 26 of the tapered optical fiber 25; in a piston-like motion). The light 22 emerging from the end 26 of the tapered optical fiber 25 is launched onto the edge of the diaphragm 38, as shown in FIGS. 3B-3C, such that the optical power of the light 22 incident on the diaphragm 38 is approximately equal to the optical power of the light incident on the adjacent substrate portion of the reflector 30 (e.g., half of the optical power of the light 22 is incident on the diaphragm 38, and the other half is incident on the adjacent substrate, excluding the small portion of the light 22 that goes into the gap 56 between the diaphragm 38 and the adjacent substrate portion). A portion of the light reflected by these two surfaces is received by and coupled into the end 26 of the tapered optical fiber 25.

When the diaphragm 38 is at rest, the reflected light is coupled back into the fiber 25 with minimal loss of optical power. When a static force is applied to the diaphragm 38, the diaphragm 38 is displaced along the z axis with respect to the adjacent substrate portion of the reflector 30. This displacement imparts a shift in the phase of the portion of the light reflected by the diaphragm 38. The reflected light still maintains a Gaussian intensity profile, but as a result of this differential phase shift, the reflected light is no longer fully coupled into the fundamental mode of the fiber 25, with the balance of the light coupled to cladding and/or radiation modes of the fiber 25, and reflected into spatial modes. This reduction in coupled power is measured at the input port of the fiber 25, which also serves as the output port (see FIG. 1D), and the displacement can be recovered from a measurement of this reduction of power. When an acoustic pressure is applied instead of a static force, the principle remains the same, except that the position of the diaphragm 38 with respect to the adjacent substrate portion of the reflector 30 is modulated in time at the acoustic wave frequency, and so is the optical power coupled back into the fundamental mode of the fiber 25. A measurement of the optical output signal then provides both the amplitude and the frequency of the acoustic wave.

The normalized optical sensitivity of the sensor 10 can be defined as the small change in the optical power coupled back into the fundamental mode of the fiber 25 normalized to the optical power inputted into the fiber 25, divided by the small displacement dz of the diaphragm 38 (e.g., equal to the change in the optical power transmission of the sensor 10 divided by the displacement dz, or equivalently, the derivative of the optical power transmission with respect to the displacement dz). In certain embodiments, the sensitivity is maximized by having the portions of the light incident on the diaphragm 38 and on the adjacent substrate portion of the reflector 30 having equal powers (e.g., 50% of the optical power incident on the diaphragm 38), and the two portions of the reflected light being in quadrature (e.g., by recessing the diaphragm 38 during fabrication by a distance $\lambda/8$ from the plane of the substrate, where $\lambda$ is the optical wavelength, as shown in FIG. 1B). This positioning of the diaphragm 38 in absence of a perturbation (e.g., acoustic wave) results in a phase shift of $\pi/2$ between the two portions of the reflected light. In certain embodiments, even if the light did not diffract between the fiber 25 and the reflector 30, 50% of the light is recoupled back into the fiber 25. In practice, as the light propagates from the fiber 25 to the reflector 30 and back to the fiber 25, the diameter of the light beam increases due to diffraction. The reflected light beam incident on the fiber 25 is therefore larger than the mode-field diameter (MFD) of the fiber mode, and the percentage of light recoupled into the fiber 25 is reduced by an additional factor $\eta$ between 0 and 1. This factor depends on the MFD of the fiber 25 and on the spacing $\delta$ between the fiber 25 and the reflector 30 (e.g., the larger the fiber MFD, and the smaller $\delta$, the weaker the diffraction and the closer $\eta$ is to 1; in other words the larger the fiber MFD, the more light is recoupled into the fiber).

Example Results

Figure 5:
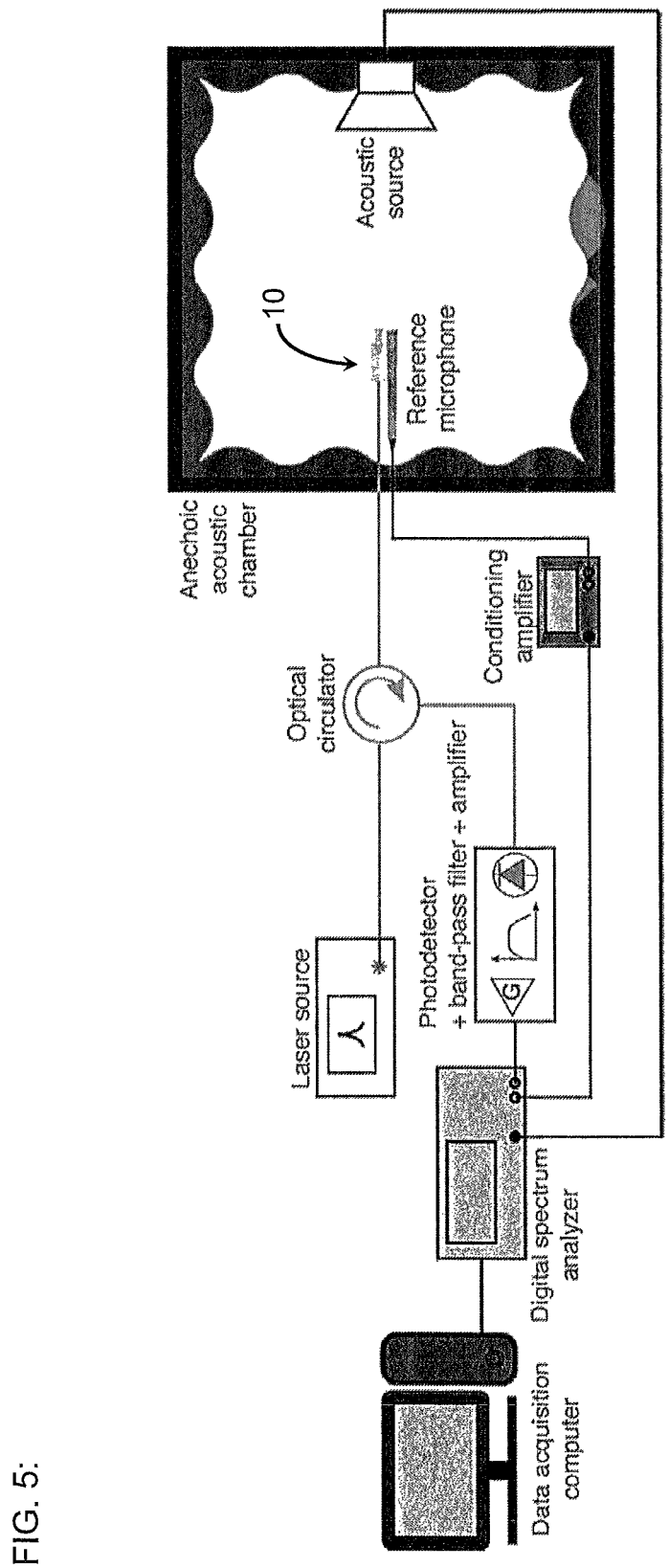
FIG. 5 schematically illustrates an example experimental configuration for measuring the sensitivity and minimum detectable pressure (MDP) of a sensor in accordance with certain embodiments described herein.

FIG. 5 schematically illustrates an example experimental configuration for measuring the sensitivity and minimum detectable pressure (MDP) of a sensor 10 in accordance with certain embodiments described herein. The light 22 was generated by a narrow linewidth external cavity laser (e.g., RIO Planex semiconductor laser) at a wavelength $\lambda=1.55$ µm. An optical circulator was configured to launch the laser light into the sensor 10, and to direct the reflected return signal to a photodiode. A photodiode, with a trans-impedance amplifier and a band-pass filter, and connected to a digital spectrum analyzer, was configured to measure the reflected return optical signal. The sensor 10 was placed in an anechoic chamber that provided insulation from ambient noise. An acoustic source (e.g., FOSTEX FF85WK) was mounted on the back wall of the chamber and generated tunable monotonic acoustic waves with frequencies between 100 Hz and 60 kHz to measure the frequency response of the sensor 10. A calibrated reference microphone (e.g., Bruel & Kjær 4191) was placed adjacent to the sensor 10 to provide an accurate measurement of the pressure incident on the sensor 10. The inside walls of the chamber were covered with acoustically damping surfaces to prevent the formation of acoustic standing waves inside the chamber, which would otherwise make reproducible measurements of the pressure incident on the sensor 10 difficult, and to ensure that the same pressure was incident on both the sensor 10 and the reference microphone. The outside walls were further covered with gypsum sheets to further dampen acoustic noise from outside the chamber. The reflection off a silicon surface at normal incidence is independent of the polarization of the light beam incident on it. Therefore, in general, the response of the sensor 10 having a silicon surface was independent of the birefringence of the fiber 25 between the laser and the sensor 10. However, for sensors 10 with other types of reflectors 30, in which the reflectivity and/or transmission of the sensor 10 are sensitive to polarization, a polarization controller can be added between the laser and the optical circulator.

Figure 6A:
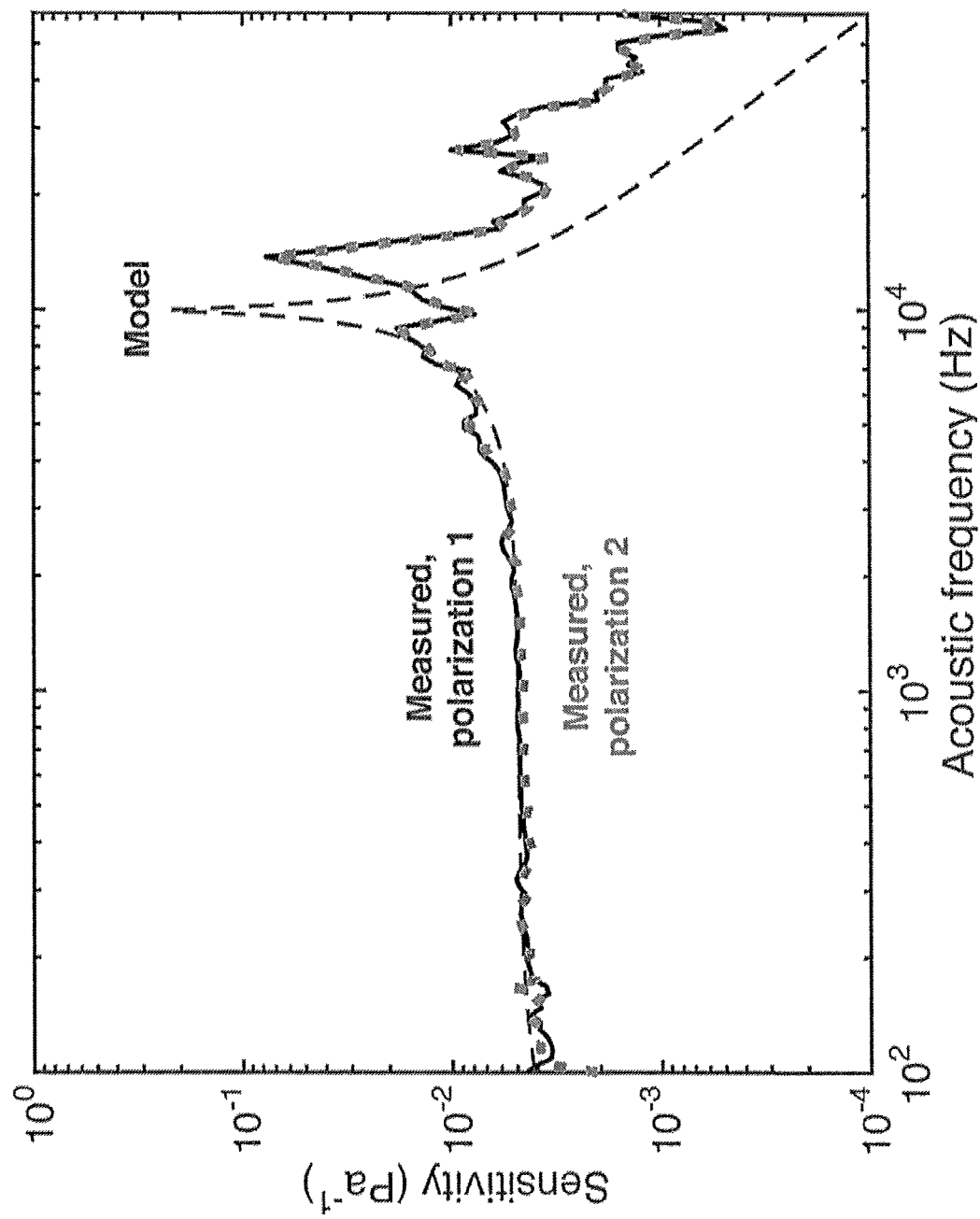
FIG. 6A shows the measured normalized sensitivity spectrum of an acoustic sensor having a diaphragm suspended on 580-μm cantilever spring structures in accordance with certain embodiments described herein.

FIG. 6A shows the measured normalized sensitivity spectrum of an acoustic sensor 10 having a diaphragm 38 suspended on eight 580-µm-long cantilever spring structures 54 in accordance with certain embodiments described herein. The spring structures 54 had a square cross-section, with each side of the square having a length of 6.5 µm. The sensitivity $S_N$ of FIG. 6A is defined as $S_N=d(P_d/P_{in})/dp$, where $P_d$ is the detected signal at the applied acoustic frequency, $P_{in}$ is the input optical power coupled into the fiber 25, and p is the applied pressure. The measured spectrum exhibits a flat response from 100 Hz to 7 kHz, and this range is limited by a 3-dB roll-off below 100 Hz imposed by the back-chamber volume, and by mechanical resonances of the diaphragm 38 at higher frequencies. The response has a fundamental mechanical resonance at 8.9 kHz, and a second resonance at 13.7 kHz, followed by a roll-off proportional to $\omega_{ac}^{-2}$, where $\omega_{ac}$ is the acoustic frequency. The average flat-band sensitivity is $4.9\times10^{-3}$ $Pa^{-1}$, which is about twice as large as reported for a previously reported PFM sensor.

The solid curve of FIG. 6A shows the measured sensitivity for a first linear polarization of the light 22 provided to the sensor 10 and the grey dots of FIG. 6A show the measured sensitivity for a second linear polarization of the light 22 provided to the sensor 10, the second linear polarization perpendicular to the first linear polarization. FIG. 6A shows that the performance of the sensor 10 is independent of the polarization of light 22.

The acoustic sensitivity of the full sensor 10, including the diaphragm 38, channels, and back-chamber 86, was modeled using the lumped-element equivalent-circuit model (see, e.g., O. Kilic et al., "Miniature photonic-crystal hydrophone optimized for ocean acoustics," J. of the Ac. Soc. of Am., vol. 129, no. 4, 1837-1850, 2011). The modeled sensitivity, plotted as a dashed curve in FIG. 6A, is in close agreement with the measured spectrum. The model correctly predicts the broad flat band and the fundamental resonance frequency at 9.9 kHz, which is within 10% of the measured frequency. The discrepancy in the second resonance frequency may arise from small differences between the modeled and actual structural dimensions, in particular, the 30-µm distance between the diaphragm 38 and inner ferrule 80 and the channels. Overall, the good agreement between measured and modeled spectra validates the understanding of the basic optical and mechanical principles underlying the operation of sensors 10 in accordance with certain embodiments described herein, and demonstrates the applicability of the lumped-element approach to model complicated structures with multiple cantilever spring structures 54.

Figure 6B:
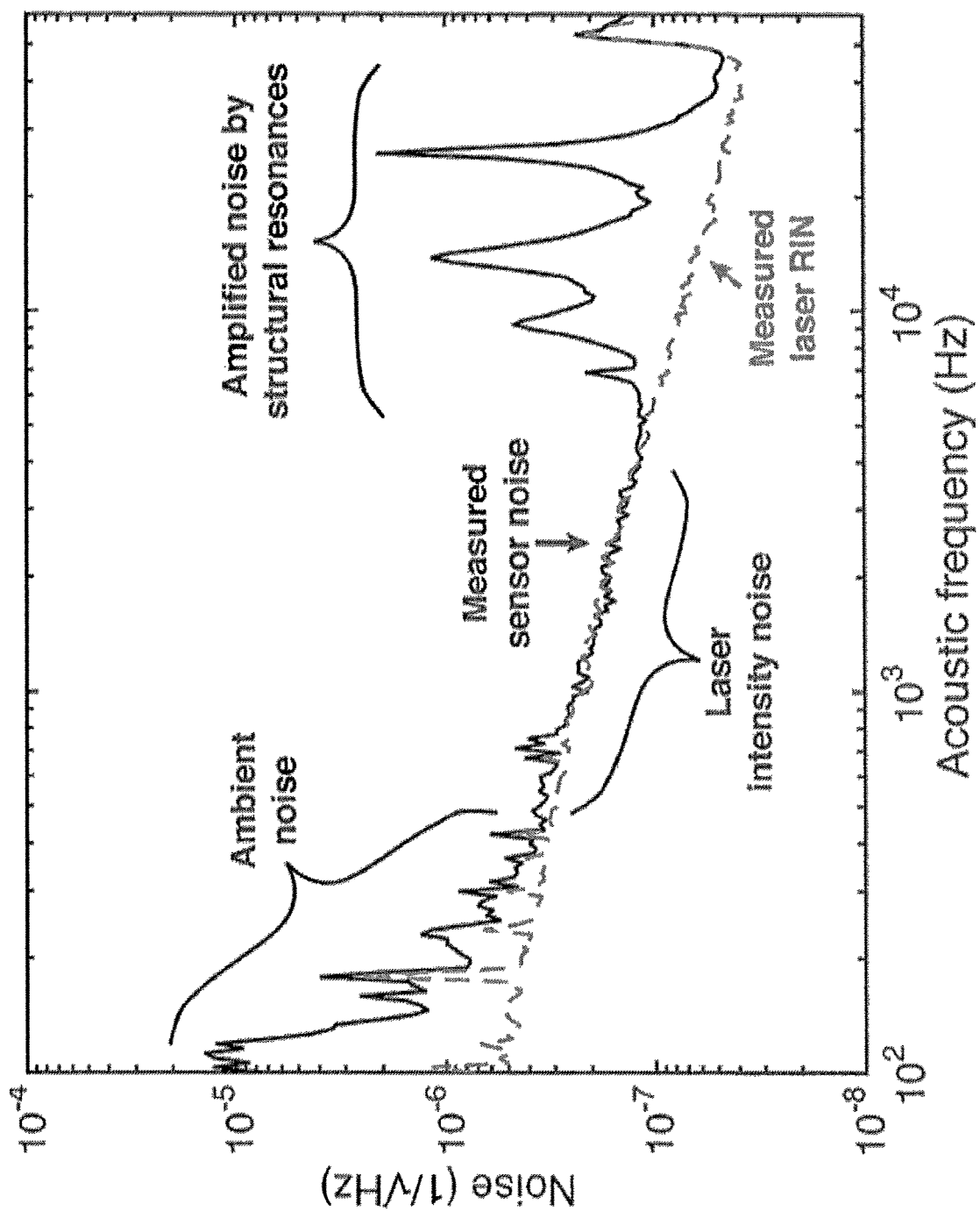
FIG. 6B shows the measured noise spectrum of the acoustic sensor of FIG. 6A in accordance with certain embodiments described herein.

FIG. 6B shows the measured noise spectrum of the acoustic sensor 10 of FIG. 6A in accordance with certain embodiments described herein. The solid curve of FIG. 6B is the measured noise spectrum normalized to the input power, and the dashed curve is the measured noise spectrum of the laser relative intensity noise (RIN). The measured noise spectrum was measured with the acoustic source turned off. The noise generally decreases with increasing frequency, with the exception of resonances in the 7-60 kHz range.

Figure 6C:
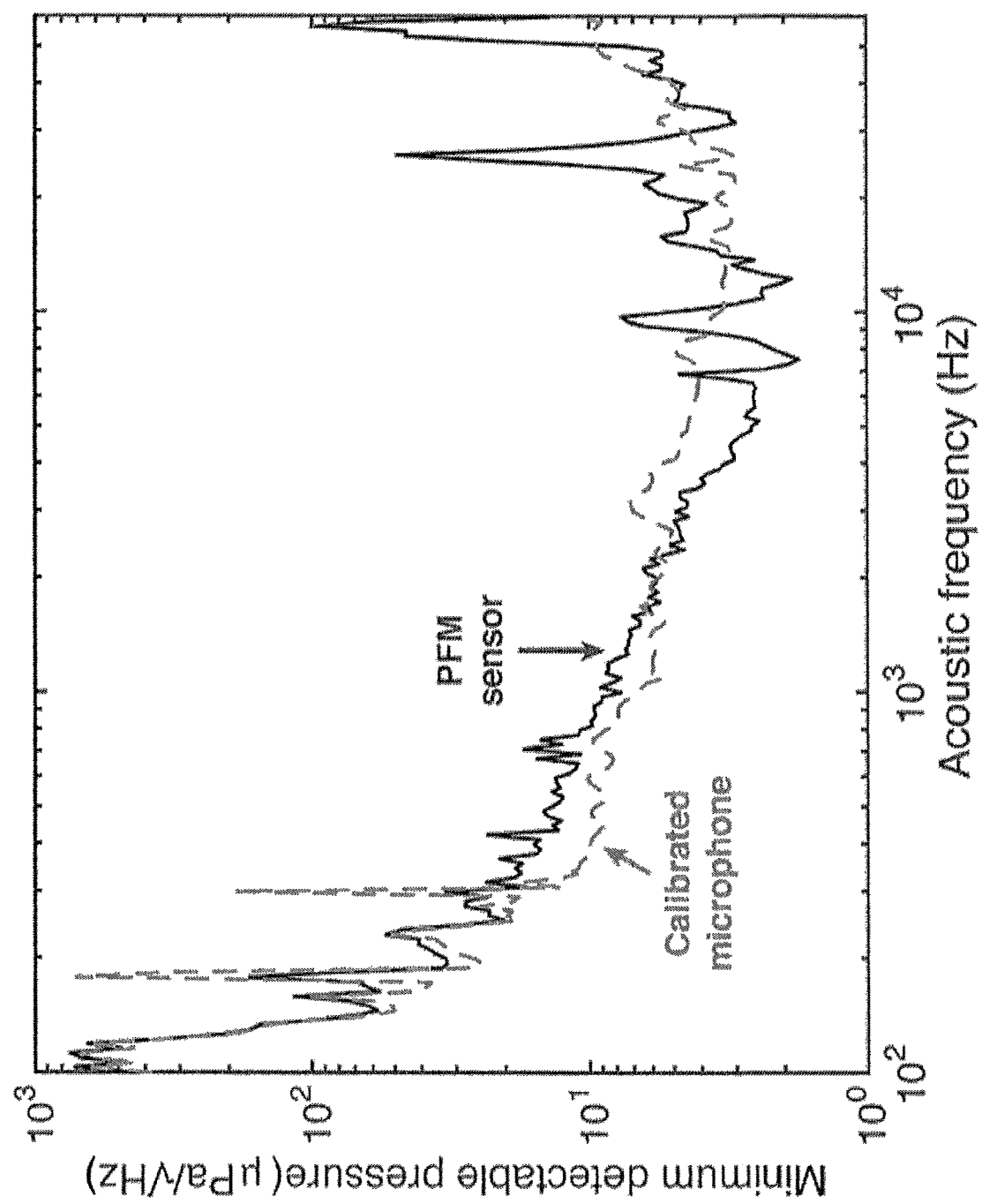
FIG. 6C shows the measured minimum detectable pressure (MDP) of the acoustic sensor of FIG. 6A in accordance with certain embodiments described herein.

The predominant noise contributions are detector noise, electrical and optical shot noise, laser relative intensity noise (RIN), and thermomechanical noise. Calculations of these contributions show that in the sensor 10 and at the detected power (0.8 mW), in the mid-frequency range (e.g., 350 Hz to 5.4 kHz), the noise is dominated by the laser RIN, as shown in FIG. 6B. Below about 350 Hz, the sensor noise exceeds the laser RIN, and is dominated by the residual ambient noise leaking into the anechoic chamber, which is verified by the measured sensor MDP spectrum of the sensor 10 of FIG. 6A, which is shown in FIG. 6C. The noise spectrum measured by the sensor 10 is shown as the solid line in FIG. 6C and the noise spectrum measured concurrently by the reference microphone is shown as the dashed line in FIG. 6C.

The sensor 10 and the reference microphone produced almost identical MDP spectra below about 350 Hz, which demonstrates that both the sensor 10 and the reference microphone picked up the same noise signal, implying that noise is dominated by the ambient noise present in the anechoic chamber, not self-noise or laser RIN. In a quieter environment, the MDP of the sensor 10 at these lower frequencies would be lower. The predicted predominant source of noise for this sensor 10 would then be laser RIN, which has a measured noise spectrum approximately one order of magnitude smaller than the ambient noise measured in the chamber.

Above about 5.4 kHz, the peaks observed in the sensor noise power spectrum (see the solid curves of FIGS. 6B and 6C) are caused by mechanical resonances of the diaphragm 38 and other sensor structures. Some sources of noise, including thermomechanical and ambient noise, are magnified by these resonances, resulting in the resonances observed in the measured noise spectrum.

FIG. 6C shows the measured minimum detectable pressure (MDP) of the acoustic sensor 10 of FIG. 6A in accordance with certain embodiments described herein. As used herein, the minimum detectable pressure (MDP) is the smallest pressure discernible by the sensor 10 above the noise floor of the whole sensing setup, or in other words, the acoustic pressure that gives an output signal-to-noise ratio of one. To characterize the MDP, the noise floor of the sensing setup was measured with the acoustic source switched off for both the sensor 10 and the reference microphone, as done in FIG. 6B. The sensor MDP spectrum was then calculated by dividing the measured noise spectrum of FIG. 6B by the measured sensitivity spectrum of FIG. 6A. FIG. 6C shows the measured MDP spectrum (solid curve) for the sensor 10 and shows the MDP measured by the reference microphone (dashed grey curve). The sensor 10 had a measured average MDP of 7.6 µPa/√Hz between 300 Hz and 20 kHz, the region in which the sensor 10 is limited by the laser intensity noise. The MDP reached a minimum value of 1.8 µPa/√Hz at 7.5 kHz and 12.2 kHz, and is equal to about 7.8 µPa/√Hz at 1 kHz, which is about twice as good as reported for a previously reported PFM sensor.

Figure 6D:
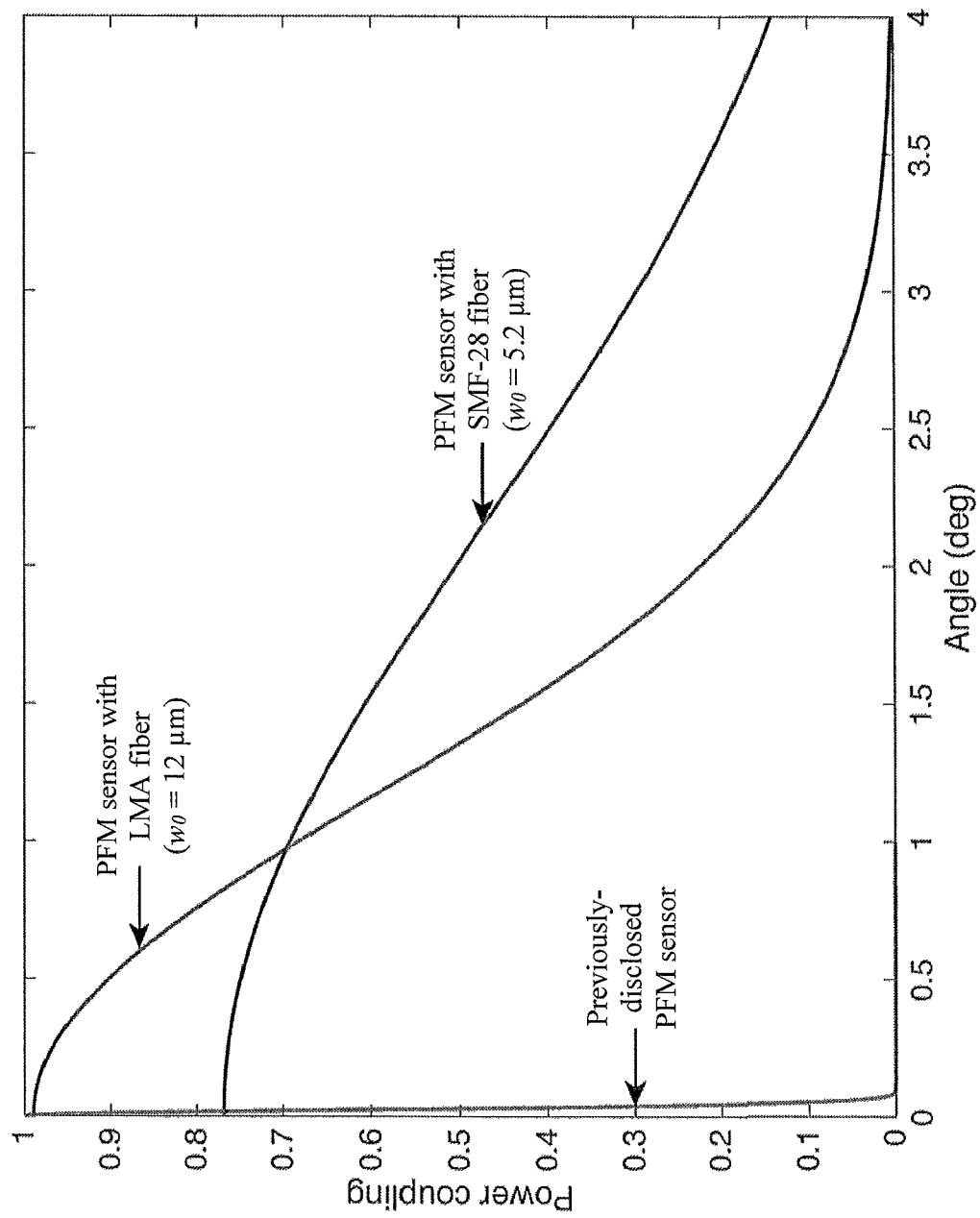
FIG. 6D shows simulations of the dependence of the recoupled optical power to the angular misalignment between the reflector and the optical waveguide in accordance with certain embodiments described herein.

FIG. 6D shows simulations of the dependence of the recoupled optical power to the angular misalignment between the reflector 30 and the optical waveguide 20 in accordance with certain embodiments described herein. This recoupled power does not take into account the 50% loss of coupling due to the $\lambda/8$ step, such that the total recoupled power is 50% of the value plotted in the vertical axis of FIG. 6D. The simulation for a previously-reported PFM sensor utilizing a GRIN lens (see, W. Jo et al., "Highly sensitive phase-front-modulation fiber acoustic sensor," J. of Lightwave Technol., Vol. 33, No. 20, 4377-4383, 2015) shows a very narrow tolerance on this misalignment, which makes alignment and assembly of the structure rather tedious. In certain embodiments described herein, the transverse size of the free-space light beam incident on the reflector 30 is much smaller than that for the previously reported PFM sensor, and the distance between the reflector 30 and the optical waveguide 20 is much shorter than in the previously reported PFM sensor. As a result, the angular sensitivity for certain embodiments described herein is greatly reduced (as shown in FIG. 6D), making for much easier and faster assembly. For example, if the optical waveguide 20 comprises a conventional SMF-28 fiber, the emergent mode radius is $w_0$=5.2 µm (e.g., $1/e^2$ intensity radius) and the radius of the light beam reflected from the reflector 30 and incident on the fiber end 26 is 7.7 µm, due to diffraction. Thus, even with no angular misalignment, the maximum optical power recoupled to the optical waveguide 20 is around 38%%, but due to a small radius of the light beam, the angular tolerance is improved by a factor of 67 at the 3-dB point (e.g., from 0.03° to 2°). To recuperate the loss in maximum optical power recoupled to the optical waveguide 20 due to the diffraction of the light beam, an LMA fiber can be used. With the LMA fiber (e.g., at the 30-µm fiber-reflector distance), 50%% of light is recoupled back into the LMA fiber, the emergent mode radius is $w_0$=12 µm (e.g., $1/e^2$ intensity radius), and the angular tolerance is improved by a factor of 47 at the 3-dB point (e.g., from 0.03° to 1.4°) compared to the SMF-28 fiber, and the 3-dB point is a factor of 1.5 smaller (e.g., 2° to 1.4°).

Figure 6E:
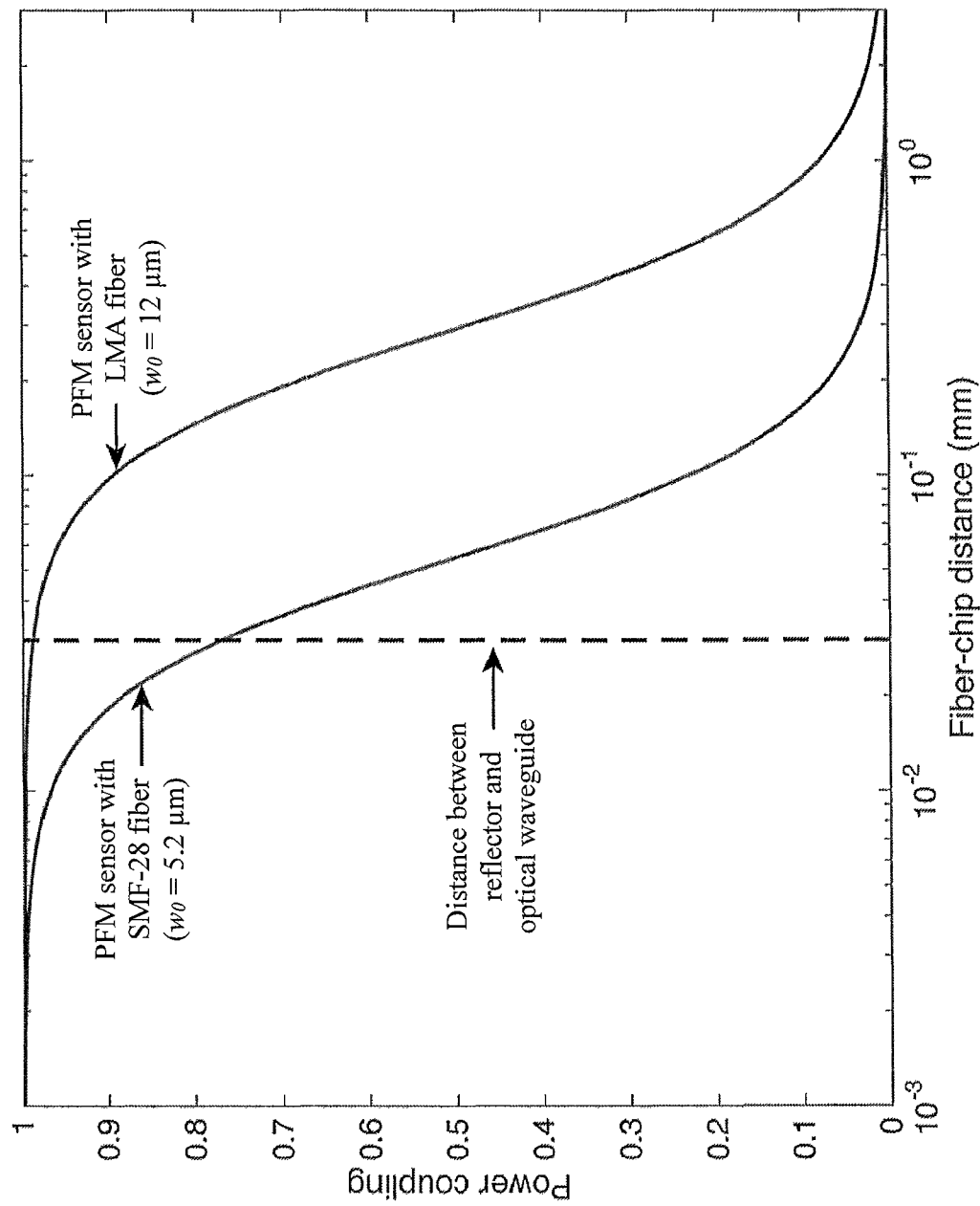
FIG. 6E shows simulations of the dependence of the recoupled optical power to the distance between the reflector and the optical waveguide in accordance with certain embodiments described herein.

FIG. 6E shows simulations of the dependence of the recoupled optical power to the distance between the reflector and the optical waveguide in accordance with certain embodiments described herein. These recoupled power values do not take into account the 50% loss of coupling due to the $\lambda/8$ step. These simulations demonstrate that the larger the emergent mode radius $w_0$, the slower the light beam emitted from the optical waveguide 20 diffracts and thus larger distances between the reflector 30 and the optical waveguide 20 can be chosen without the loss of recoupled optical power. In certain embodiments, a longer distance between the reflector 30 and the optical waveguide 20 is used to reduce the effect of squeezed-film damping between the surfaces of the diaphragm 38 and the fiber end 26. The squeezed-film damping becomes negligible at distances of 30 µm or larger. Thus, with an LMA fiber (e.g., mode radius $w_0$=12 µm), the distance between the reflector 30 and the optical waveguide 20 can be increased by a factor of 5.3 at a 3-dB point (e.g., 292 µm to 55 µm) compared to a standard SMF fiber, to extend the range of the fiber-chip distance.

Figure 7A:
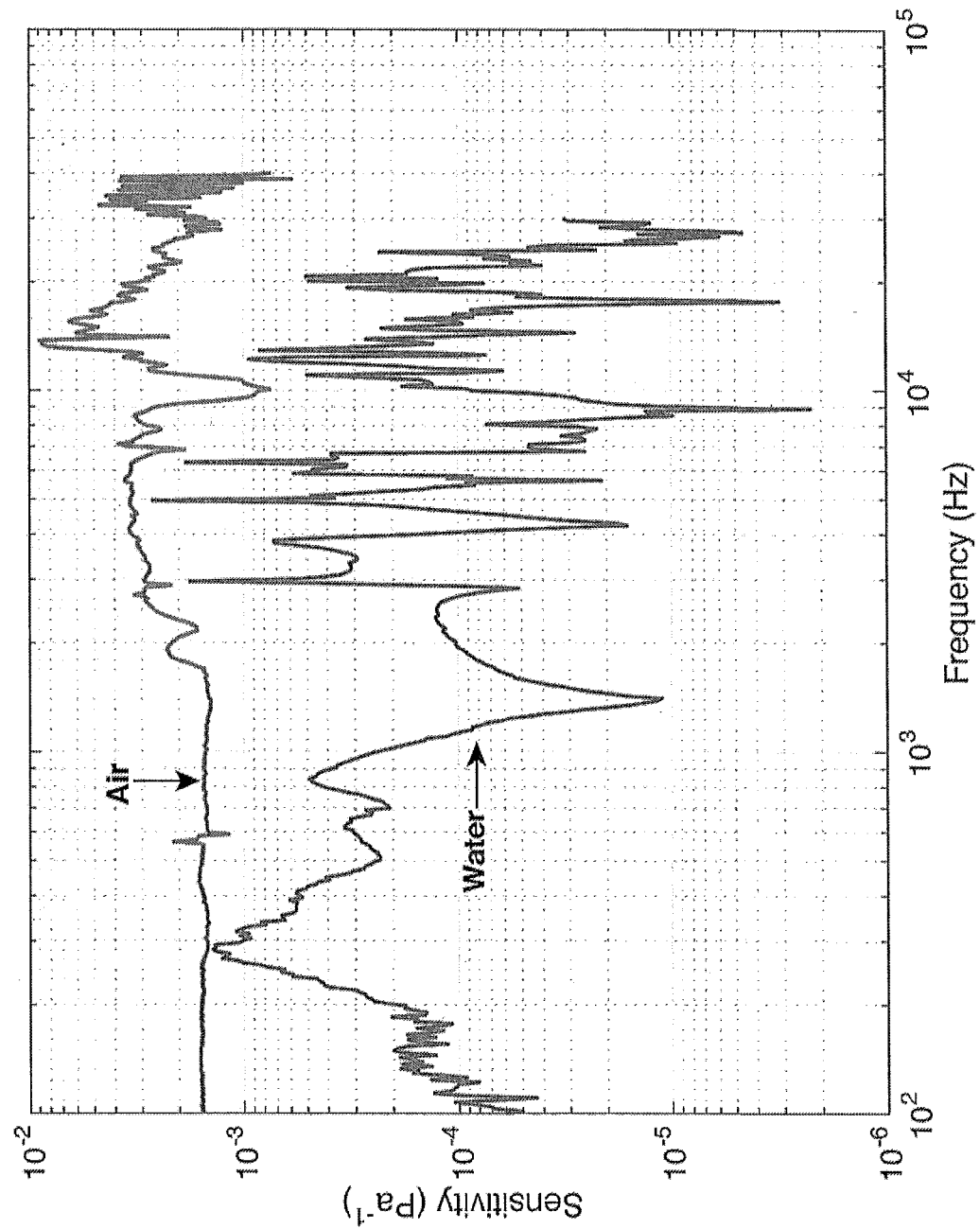
FIGS. 7A-7C show the sensitivity, noise, and MDP, respectively, of an example acoustic sensor in air and in water, in accordance with certain embodiments described herein.
Figure 7B:
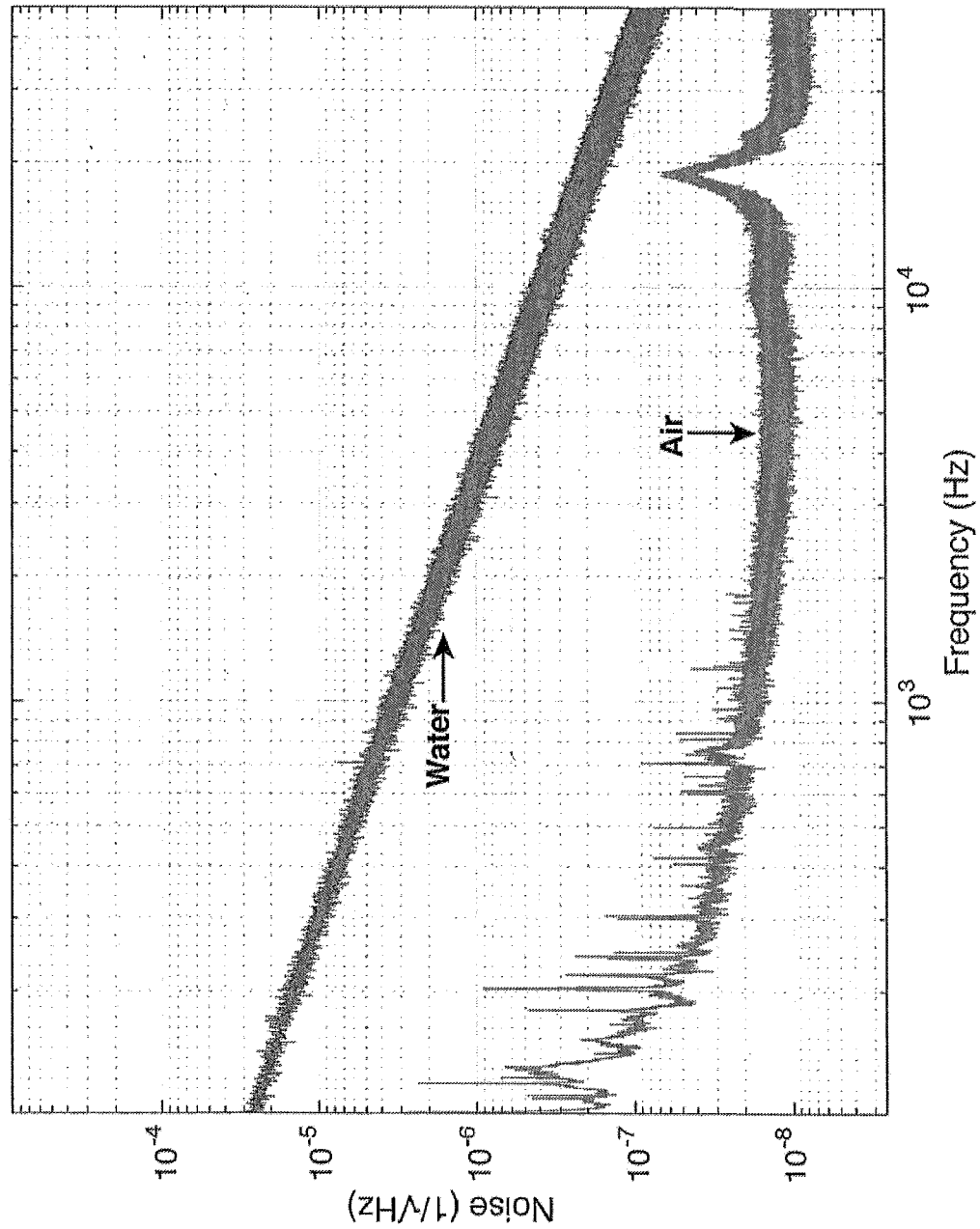
Figure 7C:
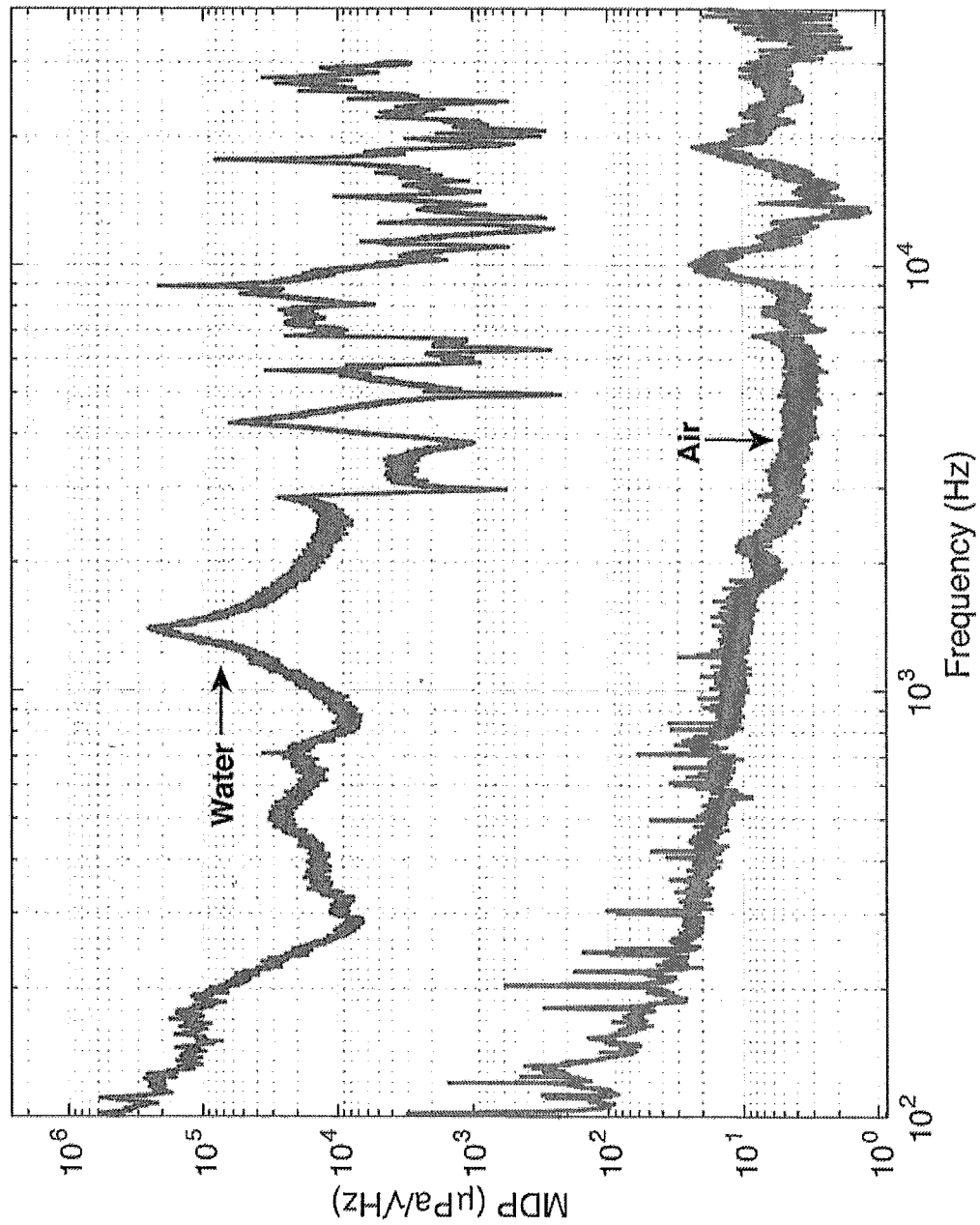

FIGS. 7A-7C show the sensitivity, noise, and MDP, respectively, of an example acoustic sensor 10 in air and in water, in accordance with certain embodiments described herein. As shown in FIG. 7A, the sensitivity demonstrates sharp resonances at frequencies above 3 kHz, e.g., a peak at 300 Hz, an anti-resonance at 1.5 kHz, and several narrow-band peaks in the kHz region and the tens of kHz region. Except for the resonance at 300 Hz, the other sharp features in the response of the sensor 10 in water are similar to but amplified compared to the response of the sensor 10 in air. Overall, the sensor's response in water is on average a factor of 4.5 smaller than the sensor's response in air at frequencies below 1.5 kHz and a factor of 15.5 smaller at frequencies above 1.5 kHz. As shown in FIG. 7B, the noise spectra of the sensor 10 in water is much higher than in air (e.g., a factor of 20 between 100 Hz to 1 kHz, with a general 1/f roll-off). As shown in FIG. 7C, the MDP of the sensor 10 in water is in the tens of mPa/√Hz at frequencies below 3 kHz and averages to a few mPa/√Hz above 3 kHz.

Other Sensors

In certain embodiments described herein, the sensor 10 is sensitive to displacements of the diaphragm 38 that are induced by a force exerted on the diaphragm 38 such that the sensor 10 performs as a force sensor. In certain embodiments, the force exerted on the diaphragm 38 is in the form of an incident pressure wave, and the sensor 10 performs as an acoustic sensor. In certain other embodiments, the force exerted on the diaphragm 38 is an acceleration force, and the sensor 10 performs as an accelerometer. The acceleration force induced on the diaphragm 38 is proportional to the mass of the diaphragm 38, and in certain embodiments, the mass of the diaphragm 38 can be tailored (e.g., increased; decreased) using standard CMOS fabrication technology (e.g., ion milling a mass and welding the mass onto the bottom of the diaphragm 38; fabricating a diaphragm having a larger volume, and an equivalently larger mass).

In certain other embodiments, the force exerted on the diaphragm 38 is a displacement force (e.g., by adding a tip to the diaphragm 38, the sensor 10 can be used as an atomic force microscope) and/or a radiation pressure (e.g., from a modulated laser beam).

Various embodiments have been described above. Although this invention has been described with reference to these specific embodiments, the descriptions are intended to be illustrative and are not intended to be limiting. Various modifications and applications may occur to those skilled in the art without departing from the true spirit and scope of the invention as defined in the claims.

What is claimed is:

1. A sensor comprising:
   at least one optical waveguide configured to emit a light beam; and
   an optical reflector optically coupled to the at least one optical waveguide, the optical reflector configured to be illuminated by the light beam and to reflect at least a portion of the light beam to the at least one optical waveguide, a distance between an end of the at least one optical waveguide and the optical reflector less than 100 microns, the optical reflector comprising:
     a first substrate portion configured to reflect a first portion of the light beam back to the at least one optical waveguide; and
     a diaphragm configured to reflect a second portion of the light beam back to the at least one optical waveguide, the diaphragm responsive to a perturbation by moving relative to the first substrate portion, the light beam centered on a region between the first substrate portion and the diaphragm.

2. The sensor of claim 1, wherein the at least one optical waveguide has an end portion optically coupled to the optical reflector, the end portion comprising a tapered fiber end or a photonic-crystal fiber end.

3. The sensor of claim 2, wherein the end portion comprises a tapered fiber end.

4. The sensor of claim 2, wherein the end portion comprises a photonic-crystal fiber end.

5. The sensor of claim 2, wherein the end portion has a mode-field diameter greater than 11 μm.

6. The sensor of claim 5, wherein the mode-field diameter is in a range between 20 μm and 40 μm.

7. The sensor of claim 1, wherein the optical reflector further comprises a plurality of elastically deformable elements in mechanical communication with the diaphragm, the plurality of elastically deformable elements configured to allow the diaphragm to move in response to the perturbation.

8. The sensor of claim 7, wherein the plurality of elastically deformable elements comprises a plurality of spring structures mechanically coupled to the first substrate portion and to the diaphragm, the plurality of spring structures configured to elastically stretch and move such that the diaphragm translates, in response to the perturbation, in a direction that is generally perpendicular to the diaphragm.

9. The sensor of claim 1, wherein the at least one optical waveguide comprises at least tapered optical fiber and/or at least one photonic-crystal fiber.

10. The sensor of claim 1, wherein the reflected second portion of the light beam differs in phase from the reflected first portion of the light beam by a phase difference that is not substantially equal to an integer multiple of π when the diaphragm is in an equilibrium position in absence of the perturbation.

11. The sensor of claim 10, wherein the phase difference is substantially equal to an odd integer multiple of π/2.

12. The sensor of claim 1, wherein the sensor does not comprise a lens between the at least one optical waveguide and the optical reflector.

13. The sensor of claim 1, wherein the optical reflector comprises a wafer, the first portion of the optical reflector comprising a first surface of the wafer, the diaphragm offset from the first portion of the optical reflector, the diaphragm in a well surrounded by the first surface.

14. The sensor of claim 13, wherein the diaphragm is thinner than portions of the wafer surrounding the diaphragm.

15. The sensor of claim 13, wherein the light has a wavelength and the well has a depth substantially equal to one-eighth of the wavelength.

16. The sensor of claim 13, wherein the light has a width less than or equal to a width of the well.

17. The sensor of claim 16, wherein the light is configured to illuminate at least a portion of a perimeter of the well such that a first portion of the light is incident on the first portion of the optical reflector outside the well while a second portion of the light is incident on the diaphragm.

18. The sensor of claim 1, wherein a phase difference between the reflected second portion of the light beam from the reflected first portion of the light beam has a magnitude that is in at least one of the following ranges: substantially greater than zero and substantially less than π, substantially greater than π and substantially less than 2π, substantially greater than 2π and substantially less than 3π, substantially greater than zero and less than or equal to π/2, greater than or equal to π/2 and substantially less than π, substantially greater than π and less than or equal to 3π/2, greater than or equal to 3π/2 and substantially less than 2π, substantially greater than 2π and less than or equal to 5π/2, and greater than or equal to 5π/2 and substantially less than 3π.

19. The sensor of claim 1, further comprising a laser configured to generate the light, the light having at least one wavelength, the sensor further comprising an optical detector and an optical signal analyzer configured to receive the reflected first portion of the light and the reflected second portion of the light from the at least one optical waveguide.

20. The sensor of claim 1, wherein a distance between the at least one optical waveguide and the optical reflector is in a range of 30 microns to 100 microns.

21. The sensor of claim 1, wherein a distance between the at least one waveguide and the optical reflector is configured to compromise between mechanical response of the optical reflector due to squeezed-film damping between the at least one waveguide and the optical reflector and recoupled optical power of light reflected by the optical reflector to the at least one waveguide.

22. The sensor of claim 1, wherein a distance between the end portion of the at least one waveguide and the optical reflector is configured to optimize sensor sensitivity.

23. The sensor of claim 1, further comprising:
 a first volume between the end of the at least one optical waveguide and the optical reflector; and
 a backchamber in fluidic communication with the first volume, the backchamber having a second volume in a range of $0.86$ cm$^3$ to $8.75$ cm$^3$.

* * * * *